US012665913B2

(12) United States Patent
Vu et al.

(10) Patent No.: US 12,665,913 B2
(45) Date of Patent: Jun. 23, 2026

(54) ANOMALY DETECTION METHOD, ANOMALY DETECTION DEVICE, AND RECORDING MEDIUM

(71) Applicant: Panasonic Intellectual Property Corporation of America, Torrance, CA (US)

(72) Inventors: Nhan Lam Chi Vu, San Jose, CA (US); Taejin Chun, San Jose, CA (US); Hai-Anh Trinh, Menlo Park, CA (US); Timothy Michael Gerard Rozario, El Dorado Hills, CA (US); Khang An Pham, Palo Alto, CA (US); Bao Quoc Nguyen, San Jose, CA (US); Thang Phuc Tran, Roseville, CA (US); Takashi Ushio, Osaka (JP); Hajime Tasaki, Osaka (JP); Tomoyuki Haga, Nara (JP); Takamitsu Sasaki, Osaka (JP); An Hoang Bao Mai, Ho Chi Minh (VN); Zooey Nguyen, Los Altos, CA (US); Christopher Nguyen, Los Altos, CA (US)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 183 days.

(21) Appl. No.: 18/197,460

(22) Filed: May 15, 2023

(65) Prior Publication Data

US 2023/0283622 A1 Sep. 7, 2023

Related U.S. Application Data

(63) Continuation of application No. PCT/JP2021/043063, filed on Nov. 24, 2021.

(Continued)

(51) Int. Cl.
*H04L 9/40* (2022.01)

(52) U.S. Cl.
CPC ........ *H04L 63/1425* (2013.01); *H04L 63/123* (2013.01); *H04L 63/1416* (2013.01); *H04L 63/20* (2013.01)

(58) Field of Classification Search
CPC .................................................. H04L 63/1425
See application file for complete search history.

(56) References Cited

U.S. PATENT DOCUMENTS

2011/0137561 A1* 6/2011 Kankainen ........... G09B 29/007
701/300
2019/0042932 A1* 2/2019 Bhat ...................... G06N 3/042
(Continued)

FOREIGN PATENT DOCUMENTS

CN 111031071 4/2020
CN 111245848 6/2020
(Continued)

OTHER PUBLICATIONS

International Search Report (ISR) from International Searching Authority (Japan Patent Office) in International Pat. Appl. No. PCT/JP2021/043063, dated Feb. 8, 2022, together with an English language translation.
(Continued)

*Primary Examiner* — Simon P Kanaan
(74) *Attorney, Agent, or Firm* — GREENBLUM & BERNSTEIN, P.L.C.

(57) ABSTRACT

An anomaly detection method for detecting an anomaly in an in-vehicle network of an in-vehicle network system including a plurality of electronic control units that transmit and receive messages via the network includes: generating image data of a reception interval between a plurality of messages included in a message sequence in a predeter-
(Continued)

10 mined period out of a message sequence received from the in-vehicle network, or image data of a transition of a sensor value of the plurality of messages; classifying the image data using a trained CNN according to whether an attack message has been inserted in the predetermined period; and when the attack message has been inserted in the predetermined period, outputting a detection result indicating that an insertion attack which is an insertion of the attack message has been made in the predetermined period.

15 Claims, 33 Drawing Sheets

Related U.S. Application Data

(60) Provisional application No. 63/117,690, filed on Nov. 24, 2020.

(56) References Cited

U.S. PATENT DOCUMENTS

| | | | | |
|---|---|---|---|---|
| 2019/0140778 | A1 | 5/2019 | Kishikawa et al. | |
| 2019/0318099 | A1* | 10/2019 | Carvalho | .............. G06F 21/577 |
| 2019/0379683 | A1* | 12/2019 | Overby | ............... G06F 9/45533 |

FOREIGN PATENT DOCUMENTS

| | | |
|---|---|---|
| WO | 2018/168291 | 9/2018 |
| WO | 2019/240054 | 12/2019 |

OTHER PUBLICATIONS

Kang et al., "Intrusion Detection System Using Deep Neural Network for In-Vehicle Network Security", PLoS One, 11(6): e0155781. doi:10.1371/journal.pone.0155781, Jun. 7, 2016.

Larson et al., "An Approach to Specification-based Attack Detection for In-Vehicle Networks", IEEE Intelligent Vehicles Symposium, Jun. 2008, pp. 220-225.

Extended European Search Report (EESR) from European Patent Office (EPO) in European Patent Appl. No. 21897997.9, dated Feb. 28, 2024.

Moore et al.: "Anomaly Detection of Cyber Physical Network Data Using 2D Images", 2019 IEEE International Conference on Consumer Electronics (ICCE), IEEE, Jan. 11, 2019 (Jan. 11, 2019), pp. 1-5, XP033528207.

Jan. 2, 2026, Communication pursuant to Article 94(3) EPC issued in corresponding EPO Patent Application No. 21 897 997.9.

Emad Aliwa et al., "Cyberattacks and Countermeasures For In-Vehicle Networks", ARXIV.ORG, Cornell University Library, 201 Olin Library Cornell University Ithaca, NY 14853, Apr. 24, 2020, XP081650542, pp. 1-37.

* cited by examiner

FIG. 2A

Max 108 bits

| SOF | ID | RTR | IDE | r | DLC | DATA | CRC | DEL | ACK | DEL | EOF |

FIG. 2B
| Attack method | Detail | Image |
|---|---|---|
| Insertion attack | Insert attack message into normal message sequence | |
| Replacement attack | Overwrite normal message with attack message | |
FIG. 3
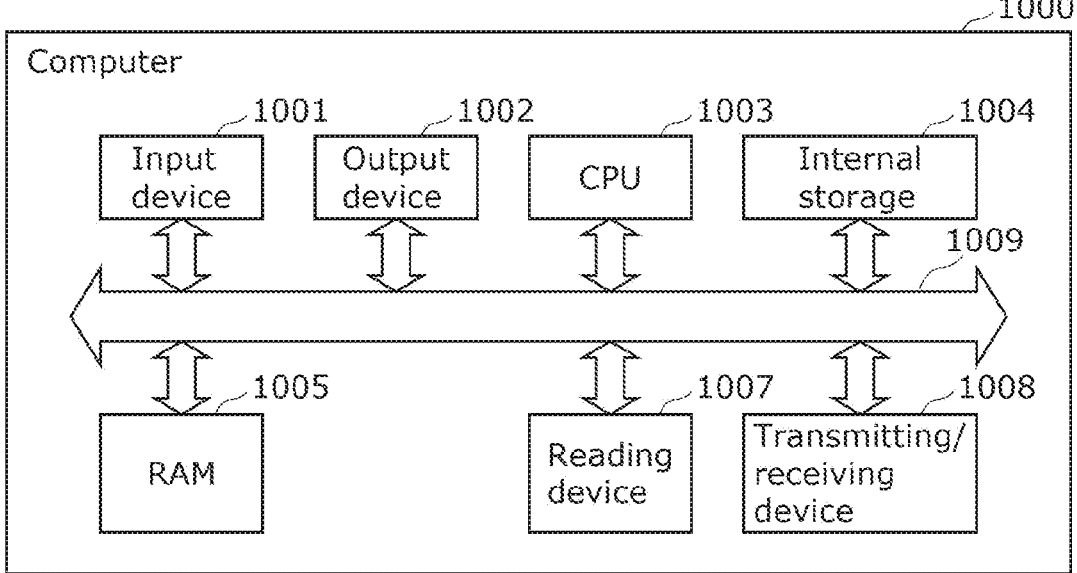
FIG. 4
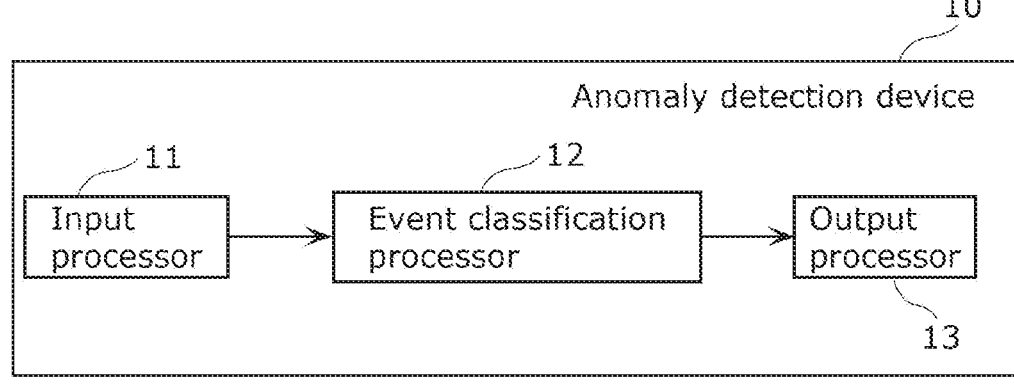

FIG. 7

Reception interval between messages

Reception interval between messages

Sensor value

Sensor value

⊘ Attack message

FIG. 12

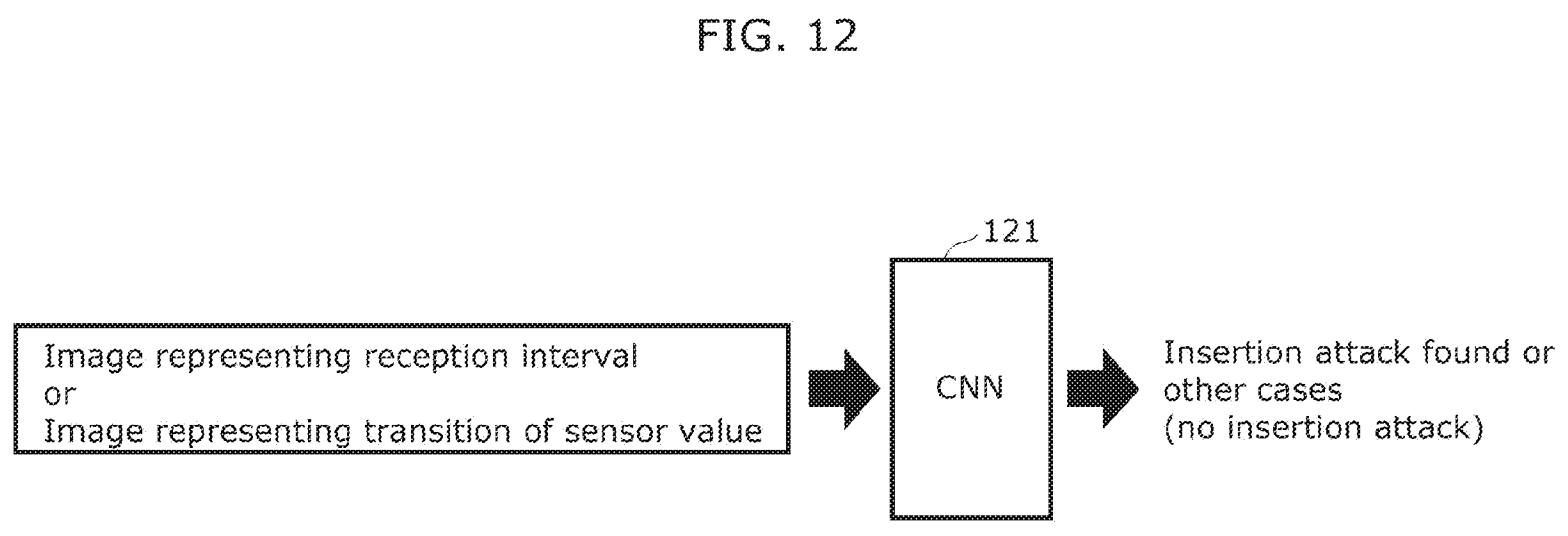

Image representing reception interval
or
Image representing transition of sensor value

121

CNN

Insertion attack found or
other cases
(no insertion attack)

FIG. 14

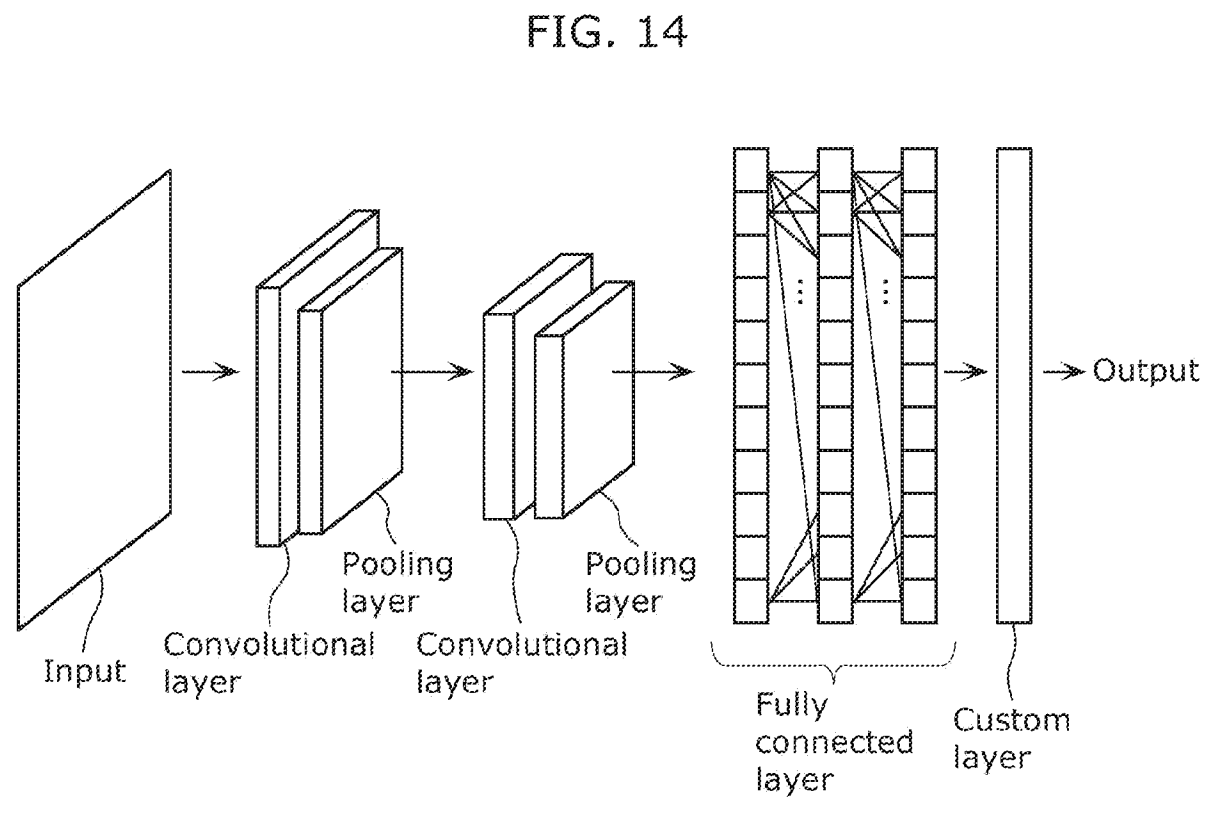

Input

Convolutional layer

Pooling layer

Convolutional layer

Pooling layer

Fully connected layer

Custom layer

Output

FIG. 20A

| Sensor ID | 1 | 2 | 3 | ... | 6 |
|---|---|---|---|---|---|
| Message No. | Reception interval (ms) | Speed Km/h | Steering angle Deg | ... | Lateral acceleration m/s$^2$ |
| 1 | 24.2 | 38.9 | 0.0 | ... | 0.02 |
| 2 | 23.8 | 39.3 | 4.0 | ... | 0.30 |
| 3 | 2.1 | 80.0 | 8.0 | ... | 0.31 |

FIG. 20B

| Message No. | Message determination result |
|---|---|
| 1 | 0 |
| 2 | 0 |
| 3 | 2 |

FIG. 23A

| Message No. | Reception interval (ms) | Speed Km/h | Steering angle Deg | ... |
|---|---|---|---|---|
| 1 | 24.2 | 38.9 | 0.0 | ... |
| 2 | 23.8 | 39.3 | 4.0 | ... |
| 3 | 2.1 | 80.0 | 8.0 | ... |

FIG. 23B

| Message No. | Speed | Steering angle | ... |
|---|---|---|---|
| 1 | 0 | 0 | 1 |
| 2 | 0 | 0 | 2 |
| 3 | 1 | 0 | 3 |

(a)          Reception time (b)          Reception time

⊘ Attack message
⊘ Normal message

Reception time

⊘ Attack message
⊘ Normal message

Sensor value

○ Normal message
◎ Attack message

Sensor value

Sensor value

○ Normal message
◎ Attack message

FIG. 35

| Rule | Detail |
|---|---|
| Reception interval rule within same window (group) | Since messages with same reception interval are classified into same group, message classified into normal group is to be determined as normal, and message classified into attack group is to be determined as anomalous |
| Equivalence attack determination rule | Difference value between each sensor value and sensor value of immediately preceding message is calculated, and messages are combined into groups accordingly; group in which difference value continues to be 0 is to be determined as normal, and group in which difference value continues to be not 0 is to be determined as anomalous |
| Regression determination rule | Since data of normal message changes continuously, message with small regression error is to be determined as normal, and message with large regression error is to be determined as anomalous |

FIG. 36A

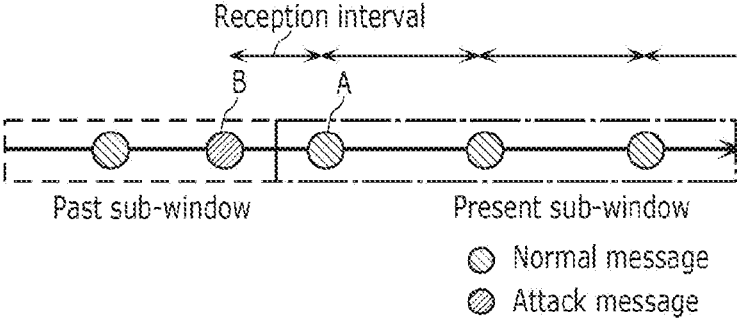

Past sub-window    Present sub-window

◯ Normal message
◎ Attack message

FIG. 36B

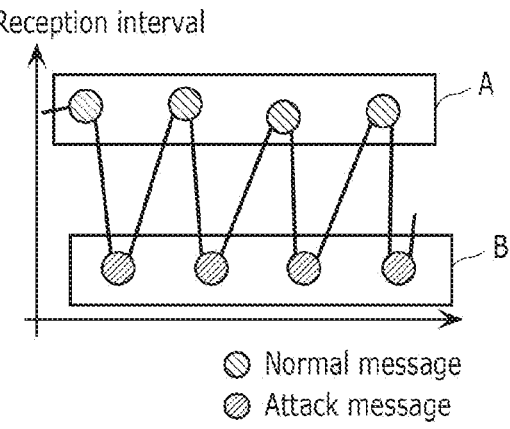

◯ Normal message
◎ Attack message

ANOMALY DETECTION METHOD, ANOMALY DETECTION DEVICE, AND RECORDING MEDIUM

CROSS REFERENCE TO RELATED APPLICATIONS

This is a continuation application of PCT International Application No. PCT/JP2021/043063 filed on Nov. 24, 2021, designating the United States of America, which is based on and claims priority of U.S. Provisional Patent Application No. 63/117690 filed on Nov. 24, 2020. The entire disclosures of the above-identified applications, including the specifications, drawings and claims are incorporated herein by reference in their entirety.

FIELD

The present disclosure relates to anomaly detection methods, anomaly detection devices, and recording media by which an anomaly in messages transmitted in an in-vehicle network is detected.

BACKGROUND

Recent years have seen a large number of devices called electronic control units (ECUs) installed in automotive interior systems. A network connecting these ECUs is called an in-vehicle network. There are numerous standards for the in-vehicle network. Among these, one of the most dominant in-vehicle networks is a controller area network (CAN), which is also referred to as a CAN bus.

The CAN bus is designed to preclude a substantial amount of physical wiring between the ECUs of an automobile. A CAN packet, that is, the payload of a message, includes data from one or more ECUs called sensors that detect behavior of a vehicle such as a vehicle speed sensor, an acceleration sensor, and a yaw rate sensor.

In the CAN bus, each ECU broadcasts a message using ID assigned thereto in advance. However, with the existing CAN buses, which are insufficient in terms of security functions, there is a risk that an anomalous message leading to a cyberattack may be inserted; in other words, there is a risk of an injection attack. The injection attack is one of common cyberattacks.

Therefore, many techniques have been proposed in order to detect and address an injection attack on a CAN bus (for example, Non Patent Literature (NPL) 1).

NPL 1 discloses a technique for accurately detecting an attack on a CAN bus from a CAN packet using a deep neural network (DNN).

CITATION LIST

Non Patent Literature

NPL 1: Min-Joo Kang and Je-Won Kang. Intrusion detection system using deep neural network for in-vehicle network security. PloS one, 11(6):e0155781, 2016.

SUMMARY

Technical Problem

However, with the technique disclosed in NPL 1, there is a risk that an attack on the CAN bus may become less likely to be detected as the cyberattack method becomes more sophisticated.

The present disclosure is conceived in view of the above-described circumstances and has an object to provide an anomaly detection method, an anomaly detection device, and a recording medium by which an attack on an in-vehicle network can be accurately detected.

Solution to Problem

In order to solve the aforementioned problems, an anomaly detection method according to one embodiment of the present disclosure is an anomaly detection method for detecting an anomaly in a network inside a vehicle, the network being included in an in-vehicle network system including a plurality of electronic control units that transmit and receive messages via the network, the anomaly detection method including: generating image data of a reception interval between a plurality of messages included in a message sequence in a predetermined period out of a message sequence received from the network, or image data of a transition of a sensor value of the plurality of messages; classifying the image data using a trained convolutional neural network (CNN) according to whether an attack message has been inserted in the predetermined period; and when the attack message has been inserted in the predetermined period, outputting a detection result indicating that an insertion attack has been made in the predetermined period, the insertion attack being an insertion of the attack message.

Note that these general or specific aspects may be implemented using a system, a method, an integrated circuit, a computer program, or a computer-readable recording medium such as a compact disc read-only memory (CD-ROM), or any combination of systems, methods, integrated circuits, computer programs, and recording media.

Advantageous Effects

With the anomaly detection method, etc., according to the present disclosure, it is possible to accurately detect an attack on an in-vehicle network.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2A is a diagram illustrating the structure of a CAN bus data frame according to Embodiment 1.

FIG. 2B is a diagram for describing attack methods of an injection attack according to Embodiment 1.

FIG. 3 is a diagram illustrating one example of the hardware configuration of a computer that implements the functions of an anomaly detection device according to an embodiment through software.

FIG. 4 is a block diagram illustrating one example of the configuration of an anomaly detection device according to Embodiment 1.

FIG. 7 is a diagram illustrating one example of the case where a present sub-window generated by a window generation processor according to Embodiment 1 includes an attack message.

FIG. 12 is a conceptual diagram of processes performed by a trained CNN according to Embodiment 1.

FIG. 14 is a diagram illustrating one example of the structure of a trained CNN according to Embodiment 1.

FIG. 20A is a diagram illustrating a specific example of feature amounts and a plurality of messages that are input to a message classifier according to Embodiment 2.

FIG. 20B is a diagram illustrating a specific example of determination results from a message classifier according to Embodiment 2.

FIG. 23A is a diagram illustrating a specific example of feature amounts and a plurality of messages that are input to a message classifier according to Embodiment 2.

FIG. 23B is a diagram illustrating a specific examples of determination results from a message classifier according to Embodiment 2.

FIG. 25 is a diagram for conceptually describing that whether an attack is an equivalence attack can be determined by calculating the difference between sensor values of messages in a message sequence.

FIG. 35 is a diagram illustrating a determination rule used in the detailed processing in Step S2435A indicated in FIG. 28.

FIG. 36A is a diagram for conceptually describing whether a message that has failed to be classified is the end of an attack.

FIG. 36B is a diagram for conceptually describing a reception interval rule within the same group illustrated in FIG. 35.

DESCRIPTION OF EMBODIMENTS

Figure 1:
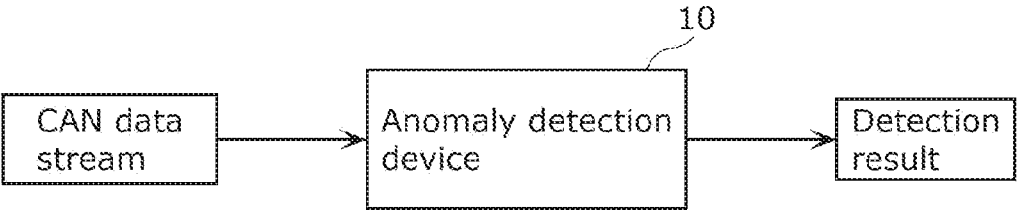
FIG. 1 is a diagram illustrating an outline of an anomaly detection device according to Embodiment 1.

An anomaly detection method according to one embodiment of the present disclosure is an anomaly detection method for detecting an anomaly in a network inside a vehicle, the network being included in an in-vehicle network system including a plurality of electronic control units that transmit and receive messages via the network, the anomaly detection method including: generating image data of a reception interval between a plurality of messages included in a message sequence in a predetermined period out of a message sequence received from the network, or image data of a transition of a sensor value of the plurality of messages; classifying the image data using a trained convolutional neural network (CNN) according to whether an attack message has been inserted in the predetermined period; and when the attack message has been inserted in the predetermined period, outputting a detection result indicating that an insertion attack has been made in the predetermined period, the insertion attack being an insertion of the attack message.

With this, using the image of the reception interval between of the plurality of messages or the image of the transition of the sensor value of the plurality of messages, it is possible to accurately detect an insertion attack in the message sequence in the predetermined period. Thus, an attack on an in-vehicle network can be accurately detected.

For example, the anomaly detection method further includes: obtaining the plurality of messages included in the predetermined period, by dividing, using a sliding window, the message sequence received from the network; and generating, from the plurality of messages obtained, image data representing the reception interval between the plurality of messages or an image representing the transition of the sensor value of the plurality of messages, to generate the image data of the reception interval between the plurality of messages or the image data of the transition of the sensor value of the plurality of messages.

When the sliding window is used in this manner, the process of receiving the message sequence in the predetermined period can be made faster; thus, an insertion attack in the message sequence in the predetermined period can be detected with reduced time delay.

For example, the anomaly detection method may further include: when the attack message has been inserted in the predetermined period, determining, from the sensor value included in each of the plurality of messages, whether the message is the attack message, based on a predetermined rule, the plurality of messages being included in the message sequence in the predetermined period.

With this, whether each of the plurality of messages included in the message sequence in the predetermined period is normal or anomalous can be determined on the basis of a rule.

For example, the anomaly detection method may further include: when the attack message has been inserted in the predetermined period, calculating difference values between sensor values of all combinations of two messages that are sequential in reception time among the plurality of messages included in the message sequence in the predetermined period; combining the plurality of messages into groups according to the difference values calculated; determining whether all of the difference values included in each of the groups are zero; when not all of the difference values are zero, outputting a detection result indicating that the insertion attack has been made in the predetermined period, the insertion attack being the insertion of the attack message; and when all of the difference values are zero, outputting the detection result indicating that in the predetermined period, a message in a group where the difference values are zero is not the attack message.

With this, by handling, as being normal, an equivalence attack having no impact on the behavior of the vehicle on which the in-vehicle network is installed, it is possible to reduce the occurrence of a normal message being mistaken for an attack message. Thus, an attack on the in-vehicle network can be accurately detected.

For example, the anomaly detection method may further include: when the attack message has been inserted in the predetermined period, detecting, from the plurality of messages included in the message sequence in the predetermined period, using another trained CNN different from the trained CNN, a message that is the attack message among the plurality of messages and a sensor that has been attacked.

With this, whether each of the plurality of messages included in the message sequence in the predetermined period is normal or anomalous can be detected.

For example, the anomaly detection method may further include: when the attack message has been inserted in the predetermined period, detecting, from each of the plurality of messages included in the message sequence in the predetermined period, using a trained long short-term memory (LSTM), whether the message is the attack message.

With this, whether each of the plurality of messages included in the message sequence in the predetermined period is normal or anomalous can be determined.

For example, the anomaly detection method may further include: when the attack message has been inserted in the predetermined period, obtaining a determination result obtained by determining, from the sensor value included in each of the plurality of messages, whether the message is the attack message, based on a predetermined rule, the plurality of messages being included in the message sequence in the predetermined period; obtaining a first detection result indicating a result of detecting, from the plurality of messages included in the message sequence in the predetermined period, using another trained CNN different from the trained CNN, a message that is the attack message among the plurality of messages and a sensor that has been attacked; obtaining a second detection result indicating a result of detecting, from each of the plurality of messages included in the message sequence in the predetermined period, using a trained long short-term memory (LSTM), whether the message is the attack message; and performing an ensemble process on the determination result obtained, the first detection result obtained, and the second detection result obtained, and outputting a result of the ensemble process. In the ensemble process, (i) one of the determination result, the first detection result, or the second detection result may be selected, or (ii) the determination result obtained, the first detection result obtained, and the second detection result obtained may be integrated by calculation of a weighted average of the determination result obtained, the first detection result obtained, and the second detection result obtained.

With this, it is possible to output a result obtained by selecting or combining advantages of the rule base, the CNN, and the LSTM while reducing variations in individual results thereof; thus, whether each of the plurality of messages included in the message sequence in the predetermined period is normal or anomalous can be accurately detected.

For example, an anomaly detection device according to one embodiment of the present disclosure is an anomaly detection device for detecting an anomaly in a network inside a vehicle, the network being included in an in-vehicle network system including a plurality of electronic control units that transmit and receive messages via the network, the anomaly detection device including: a processor; and a memory. The anomaly detection device generates image data of a reception interval between a plurality of messages included in a message sequence in a predetermined period out of a message sequence received from the network, or image data of a transition of a sensor value of the plurality of messages. The anomaly detection device classifies the image data using a trained convolutional neural network (CNN) according to whether an attack message has been inserted in the predetermined period. When the attack message has been inserted in the predetermined period, the anomaly detection device outputs a detection result indicating that an insertion attack has been made in the predetermined period, the insertion attack being an insertion of the attack message.

Note that these general or specific aspects may be implemented using a system, a method, an integrated circuit, a computer program, or a computer-readable recording medium such as a compact disc read-only memory (CD-ROM), or any combination of systems, methods, integrated circuits, computer programs, and recording media.

Note that each of the embodiments described below shows one specific example of the present disclosure. Specifically, the numerical values, shapes, structural elements, steps, the processing order of the steps, etc., shown in the following embodiments are mere examples, and therefore do not limit the present disclosure. Among the structural elements in the following embodiments, structural elements not recited in any one of the independent claims will be described as arbitrary structural elements. In every embodiment, various features can be combined.

Embodiment 1

Hereinafter, an information processing method, etc., performed by anomaly detection device 10 according to Embodiment 1 will be described with reference to the drawings.

[1. Outline of Anomaly Detection Device 10]

FIG. 1 is a diagram illustrating an outline of anomaly detection device 10 according to Embodiment 1.

Anomaly detection device 10 is used to detect an anomaly in an in-vehicle network, which is a network inside a vehicle, of an in-vehicle network system including a plurality of electronic control units (ECUs) that transmit and receive messages via the in-vehicle network. As illustrated in FIG. 1, anomaly detection device 10 receives a CAN data stream flowing in the in-vehicle network and outputs a detection result indicating event-level detection of an anomaly in the in-vehicle network. The CAN data stream is a message sequence received from the in-vehicle network and includes a plurality of messages.

Figure 2A:
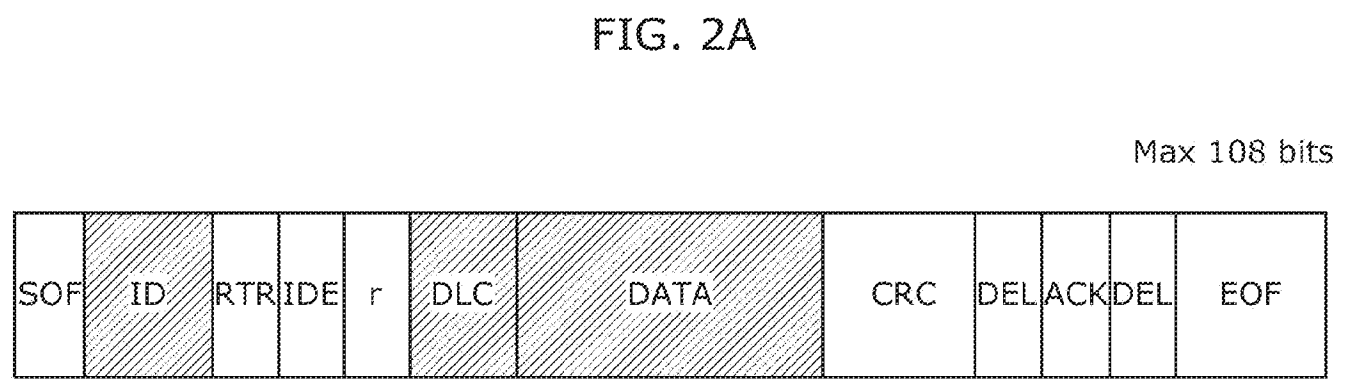

FIG. 2A is a diagram illustrating the structure of a CAN bus data frame according to Embodiment 1.

The CAN bus data frame illustrated in FIG. 2A is also referred to as a message or a CAN packet in the CAN bus, but will be hereinafter referred to as a message.

As illustrated in FIG. 2A, the structure of the message is made up of fields, namely, a start of frame (SOF), an ID field, a remote transmission request (RTR), an identifier extension (IDE), a reserved bit "r", a data length code (DLC), a data field, a cyclic redundancy check (CRC) sequence, a CRC delimiter "DEL", an acknowledgement (ACK) slot, an ACK delimiter "DEL", and an end of frame (EOF).

Note that the message has a simple structure including three important portions, namely, the ID field, the DLC, and the data field including main content. ID is used to identify the message. The ID field, which is made up of 11 bits, for example, stores a value indicating the type of data. The value of the ID is also used to indicate the priority of the message; for example, a message with ID having a small value is given priority over a message with ID having a large value. The DLC, which is made up of four bits, is a value indicating the length of the data field. The data field, which is made up of a maximum of 64 bits, stores a value indicating content of the message.

FIG. 2B is a diagram for describing attack methods of an injection attack according to Embodiment 1.

As described above, the injection attack is a cyberattack that inserts an attack message which is unauthorized or anomalous into a message sequence. The injection attack, which is one of common cyberattacks, is a cyberattack assumed in the present embodiment. The attack methods of the injection attack can be divided as an insertion attack and a replacement attack, as illustrated in FIG. 2B.

The insertion attack is an attack method in which an attack message is inserted into a normal message sequence. Specifically, the insertion attack is an injection attack in which attack messages indicated by solid, hatched circles are inserted in between normal messages indicated by dotted, hatched circles, as illustrated in FIG. 2B, and thus an attack message is inserted into a message sequence.

The replacement attack is an attack method in which a normal message is overwritten with an attack message. Specifically, the replacement attack is an injection attack in which attack messages indicated by solid, hatched circles replace normal messages indicated by dotted, hatched circles, as illustrated in FIG. 2B, and thus an attack message is inserted into a message sequence.

[1.1 Hardware Configuration of Anomaly Detection Device 10]

FIG. 3 is a diagram illustrating one example of the hardware configuration of computer 1000 that implements the functions of anomaly detection device 10 according to the embodiment through software.

Computer 1000 includes input device 1001, output device 1002, central processing unit (CPU) 1003, internal storage 1004, random access memory (RAM) 1005, reading device 1007, transmitting/receiving device 1008, and bus 1009, as illustrated in FIG. 3. Input device 1001, output device 1002, CPU 1003, internal storage 1004, RAM 1005, reading device 1007, and transmitting/receiving device 1008 are connected using bus 1009.

Input device 1001, which serves as a user interface such as an input button, a touch pad, and a touch panel display, receives user input. Note that input device 1001 may be configured to not only receive user touch input, but also receive voice control and a remote operation using a remote control or the like.

Output device 1002, which is also used as input device 1001, includes a touch pad, a touch panel display, or the like and notifies a user of information the user needs to know.

Internal storage 1004 is a flash memory or the like. A program, etc., for implementing the functions of anomaly detection device 10 may be stored in internal storage 1004 in advance.

RAM 1005, which is a random-access memory, is used to store data, etc., at the time of execution of a program or an application.

Reading device 1007 reads information from a recording medium such as a universal serial bus (USB) flash drive. Reading device 1007 reads the aforementioned program, application, etc., from a recording medium on which said program, application, etc., are recorded, and stores the read program, application, etc., into internal storage 1004.

Transmitting/receiving device 1008 is a communication circuit for performing wired or wireless communication. For example, transmitting/receiving device 1008 may communicate with a server device or cloud storage connected to a network, download the aforementioned program, application, etc., from the server device or the cloud storage, and store the read program, application, etc., into internal storage 1004.

CPU 1003, which is a central processing unit, copies the program, application, etc., stored in internal storage 1004 onto RAM 1005, sequentially reads commands included in said program, application, etc., from RAM 1005, and executes the read commands. Note that the commands may be executed directly from internal storage 1004.

[1.2 Configuration of Anomaly Detection Device 10]

FIG. 4 is a block diagram illustrating one example of the configuration of anomaly detection device 10 according to Embodiment 1.

Anomaly detection device 10 according to the present embodiment includes input processor 11, event classification processor 12, and output processor 13, as illustrated in FIG. 1. Note that output processor 13 is not an essential element as long as the result of classification by event classification processor 12 can be obtained.

[1.2.1 Input Processor 11]

When the CAN data stream flowing in the in-vehicle network is input, input processor 11 obtains the plurality of messages. Furthermore, input processor 11 generates image data of the reception interval between the plurality of messages obtained or image data of the transition of the sensor value of the plurality of messages obtained. In the present embodiment, input processor 11 generates image data of the reception interval between the plurality of messages included in the message sequence in the predetermined period out of the message sequence received from the in-vehicle network, or image data of the transition of the sensor value of the plurality of messages.

Figure 5:
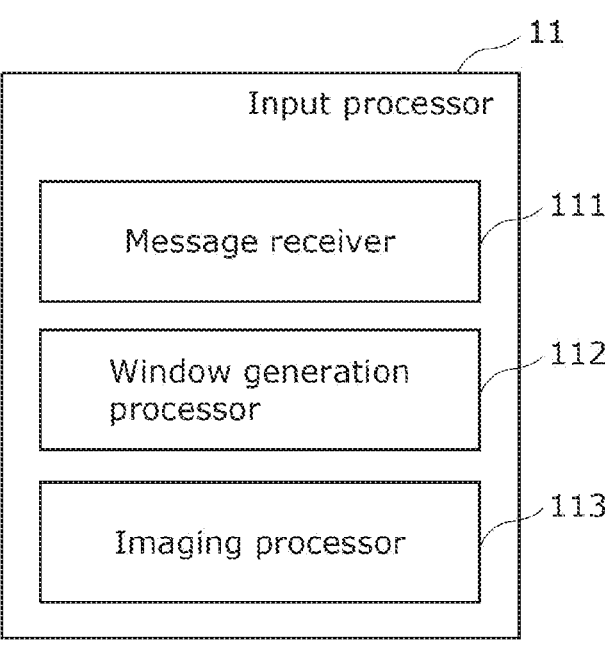
FIG. 5 is a block diagram illustrating one example of the detailed configuration of an input processor illustrated in FIG. 4.

FIG. 5 is a block diagram illustrating one example of the detailed configuration of input processor 11 illustrated in FIG. 4.

As illustrated in FIG. 5, input processor 11 according to the present embodiment includes message receiver 111, window generation processor 112, and imaging processor 113.

[1.2.1.1 Message Receiver 111]

The CAN data stream flowing in the in-vehicle network is input, and thus message receiver 111 receives the message sequence from the in-vehicle network.

[1.2.1.2 Window Generation Processor 112]

Window generation processor 112 obtains the plurality of messages included in the predetermined period by dividing, using a sliding window, the message sequence received by message receiver 111 from the in-vehicle network.

Figure 6A:
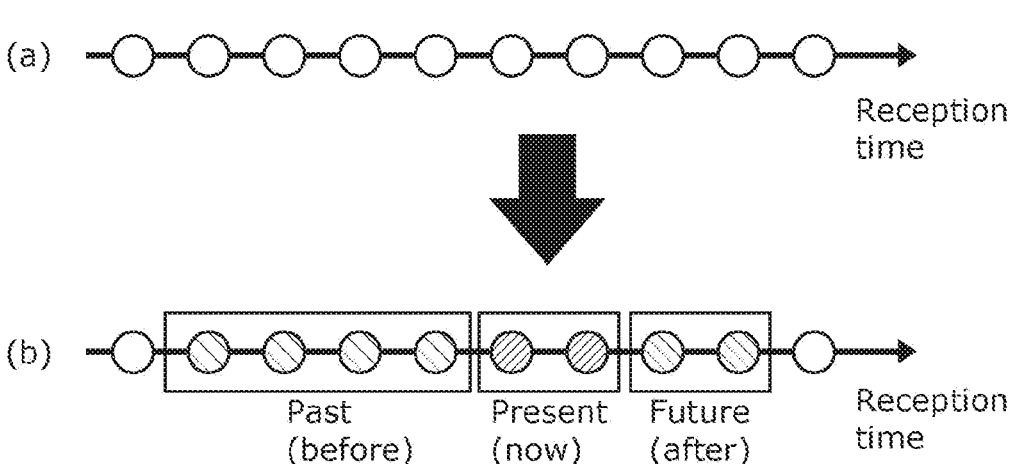
FIG. 6A is a diagram for describing a window generation method performed by a window generation processor according to Embodiment 1.
Figure 6B:
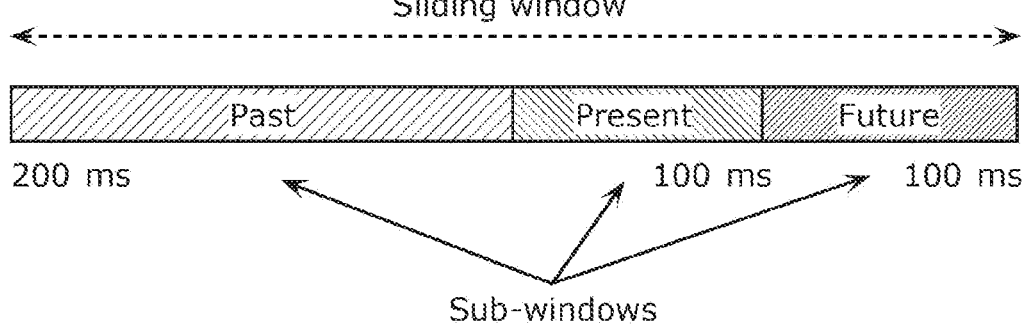
FIG. 6B is a diagram illustrating one example of the size of a sub-window generated by a window generation processor according to Embodiment 1.

FIG. 6A is a diagram for describing a window generation method performed by window generation processor 112 according to Embodiment 1. FIG. 6B is a diagram illustrating one example of the size of a sub-window generated by window generation processor 112 according to Embodiment 1. Note that the window means a buffer region for storing the received messages.

FIG. 6A illustrates, in (a), one example of the message sequence received by message receiver 111. Each of the plurality of messages included in the message sequence is indicated by a circle. FIG. 6A illustrates, in (b), one example of the sliding window generated by window generation processor 112.

More specifically, window generation processor 112 generates a sliding window divided into three portions, namely, past, present, and future sub-windows. In the present embodiment, the size of the past sub-window is set to 200 ms, the size of the present sub-window is set to 100 ms, and the size of the future sub-window is set to 100 ms, as illustrated in FIG. 6B.

Figure 7:
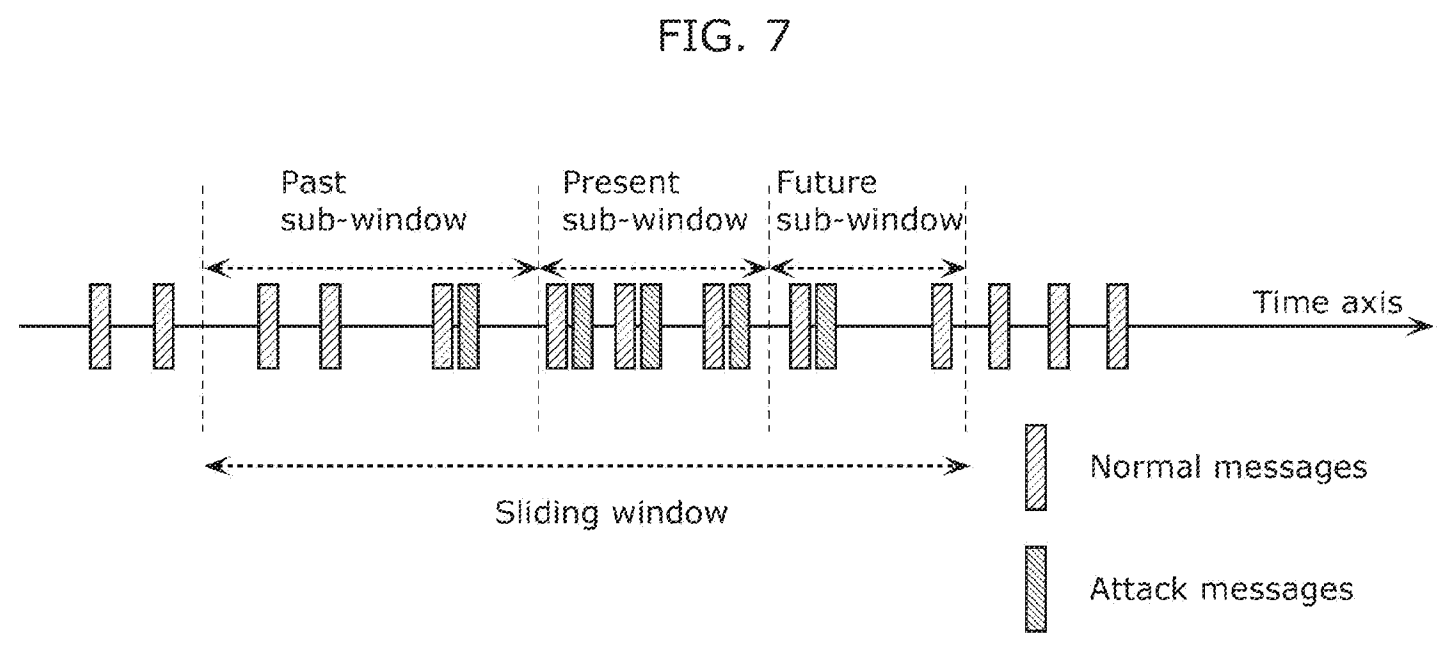

FIG. 7 is a diagram illustrating one example of the case where the present sub-window generated by window generation processor 112 according to Embodiment 1 includes an attack message.

As illustrated in FIG. 7, past, present, and future sub-windows are generated in order to detect whether the present sub-window includes an attack event, in other words, whether an attack message has been inserted into the present sub-window. Note that when the future sub-window is generated, latency occurs in detection time, but insertion of an attack message into the present sub-window can be more reliably detected.

[1.2.1.3 Imaging Processor 113]

Imaging processor 113 generates, from the plurality of messages obtained by window generation processor 112, image data representing the reception interval between the plurality of messages or an image representing the transition of the sensor value of the plurality of messages. In this manner, using the plurality of messages obtained by window generation processor 112, imaging processor 113 generates image data of the reception interval between of the plurality of messages or image data of the transition of the sensor value of the plurality of messages.

Next, the difference between the case where an insertion attack has been made and the case where no insertion attack has been made will be described with reference to FIG. 8A to FIG. 9B.

Figure 8A:
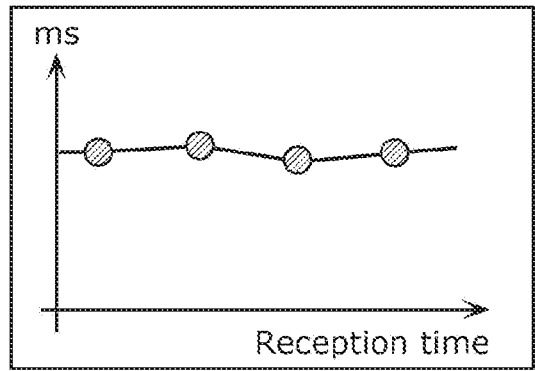
FIG. 8A is a diagram conceptually describing reception intervals in a normal message sequence in the case where no insertion attack has been made.
Figure 8B:
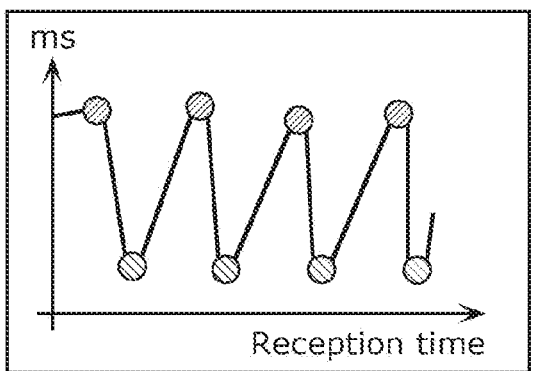
FIG. 8B is a diagram conceptually describing reception intervals in an anomalous message sequence in the case where an insertion attack has been made.

FIG. 8A is a diagram conceptually describing reception intervals in a normal message sequence in the case where no insertion attack has been made. FIG. 8B is a diagram conceptually describing reception intervals in an anomalous message sequence in the case where an insertion attack has been made.

In the CAN bus, messages are transmitted periodically, meaning that there is no disturbance in the reception interval between the messages in a normal message sequence, as illustrated in FIG. 8A. In contrast, there is a disturbance in the reception interval between the messages in an anomalous message sequence, as illustrated in FIG. 8B. In other words, when an insertion attack occurs, the reception interval between the messages is disturbed, as is clear from the comparison between FIG. 8A and FIG. 8B.

Figure 9A:
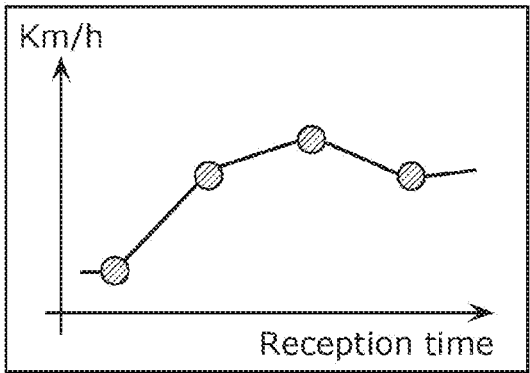
FIG. 9A is a diagram conceptually describing sensor values in a normal message sequence in the case where no insertion attack has been made.
Figure 9B:
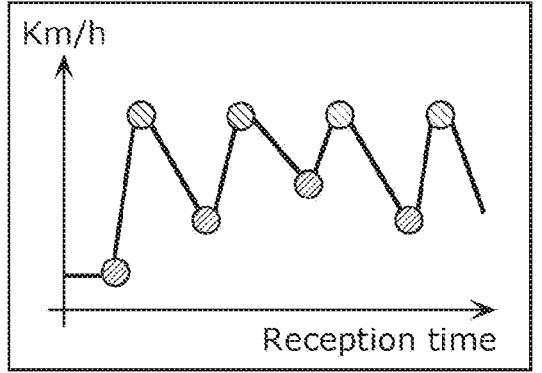
FIG. 9B is a diagram conceptually describing sensor values in an anomalous message sequence in the case where an insertion attack has been made.

FIG. 9A is a diagram conceptually describing sensor values in a normal message sequence in the case where no insertion attack has been made. FIG. 9B is a diagram conceptually describing sensor values in an anomalous message sequence in the case where an insertion attack has been made.

As illustrated in FIG. 9A, there is no disturbance in the sensor values included in the messages in a normal message sequence. In contrast, as illustrated in FIG. 9B, there is a disturbance in the sensor values included in messages in an anomalous message sequence. In other words, when an insertion attack occurs, the message sensor value is disturbed, as is clear from the comparison between FIG. 9A and FIG. 9B.

This shows that by using the reception interval between the plurality of messages or the transition of the sensor value of the plurality of messages, it is possible to detect whether an insertion attack has been made.

Therefore, using the plurality of messages obtained by window generation processor 112, imaging processor 113 generates image data of the reception interval between the plurality of messages or the transition of the sensor value of the plurality of messages.

Figure 10A:
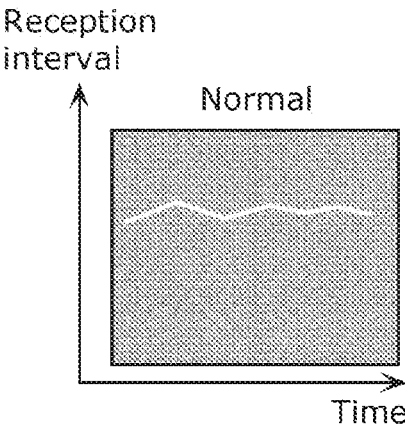
FIG. 10A is a diagram illustrating one example of an image of reception intervals in a message sequence in the case where no insertion attack has been made in Embodiment 1.
Figure 10B:
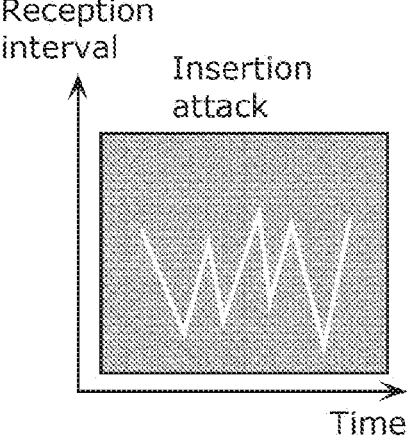
FIG. 10B is a diagram illustrating one example of an image of reception intervals in a message sequence in the case where an insertion attack has been made in Embodiment 1.

FIG. 10A is a diagram illustrating one example of an image of reception intervals in a message sequence in the case where no insertion attack has been made in Embodiment 1. FIG. 10B is a diagram illustrating one example of an image of reception intervals in a message sequence in the case where an insertion attack has been made in Embodiment 1.

Figure 11A:
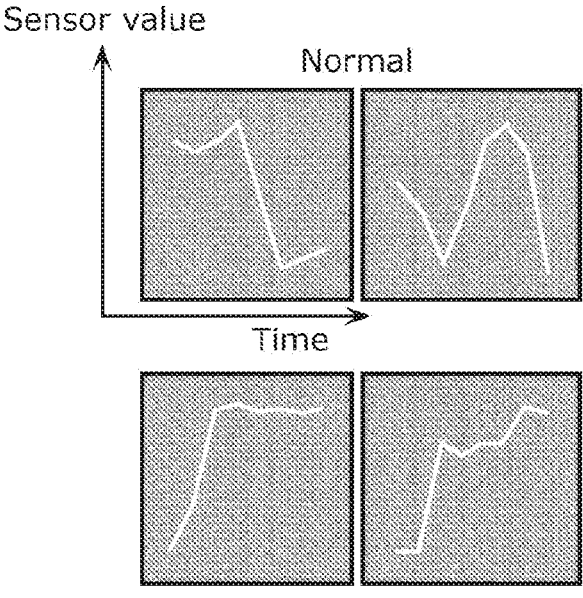
FIG. 11A is a diagram illustrating one example of an image of sensor values in a message sequence in the case where no insertion attack has been made in Embodiment 1.
Figure 11B:
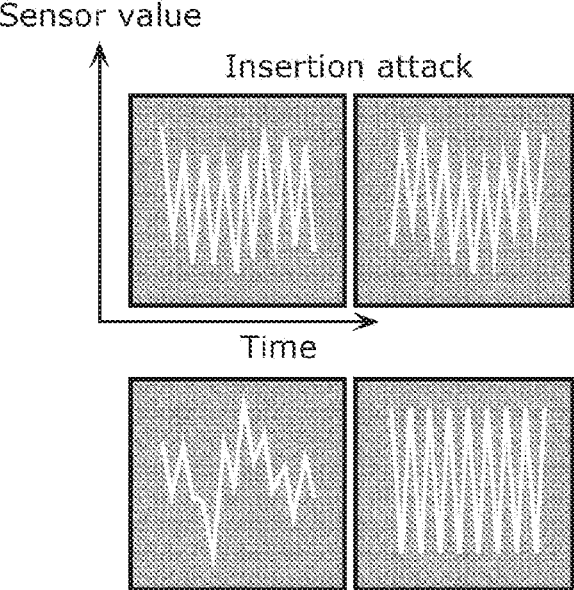
FIG. 11B is a diagram illustrating one example of an image of sensor values in a message sequence in the case where an insertion attack has been made in Embodiment 1.

FIG. 11A is a diagram illustrating one example of an image of sensor values in a message sequence in the case where no insertion attack has been made in Embodiment 1. FIG. 11B is a diagram illustrating one example of an image of sensor values in a message sequence in the case where an insertion attack has been made in Embodiment 1. FIG. 11A and FIG. 11B illustrate a plurality of images as one example. Note that each of the images illustrated in FIG. 10A to FIG. 11B is generated as an image of 96 pixels by 96 pixels, for example.

Imaging processor 113 can obtain an image such as that illustrated in FIG. 10A or FIG. 10B, for example, by generating image data of the reception intervals between the plurality of messages from the plurality of messages obtained by window generation processor 112. Similarly, imaging processor 113 can obtain an image such as that illustrated in FIG. 11A or FIG. 11B, for example, by generating image data of the sensor values of the plurality of messages from the plurality of messages obtained by window generation processor 112. The comparison between FIGS. 10A and 10B and FIGS. 11A and 11B shows that in FIGS. 11A and 11B which are images generated when an insertion attack has been made, the sensor value and the message reception frequency include characteristic changes.

[1.2.2 Event Classification Processor 12]

Event classification processor 12 detects whether an insertion attack has been made in the predetermined period in the message sequence received from the in-vehicle network. More specifically, using the trained convolutional neural network (CNN) 121, event classification processor 12 classifies the image data according to whether an attack message has been inserted in between the plurality of messages included in the predetermined period. The plurality of messages included in the predetermined period are the plurality of messages included in the present sub-window mentioned above.

Trained CNN 121 is one example of an event classifier capable of classifying the image data according to whether an attack message has been inserted in between the plurality of messages included in the predetermined period. This event classifier is trained using, as training data, images such as those illustrated in FIG. 10A to FIG. 11B, specifically, images representing the sensor values of normal and attack messages or the reception intervals between the normal and attack messages, for example.

Note that the event classifier is not limited to being CNN 121 and may be a long short-term memory (LSTM) or may be a bi-directional long short-term memory (BLSTM).

Furthermore, event classification processor 12 may determine, on the basis of a predetermined rule, whether an attack message has been inserted in the predetermined period. In this case, it is sufficient that event classification processor 12 determine, from statistics of the reception frequency or the reception interval between the plurality of messages obtained by window generation processor 112, whether an attack message has been inserted in the predetermined period. Examples of the statistics of the reception interval herein include the difference between reception times of the plurality of messages and the average of the reception intervals between the plurality of messages.

Figure 13:
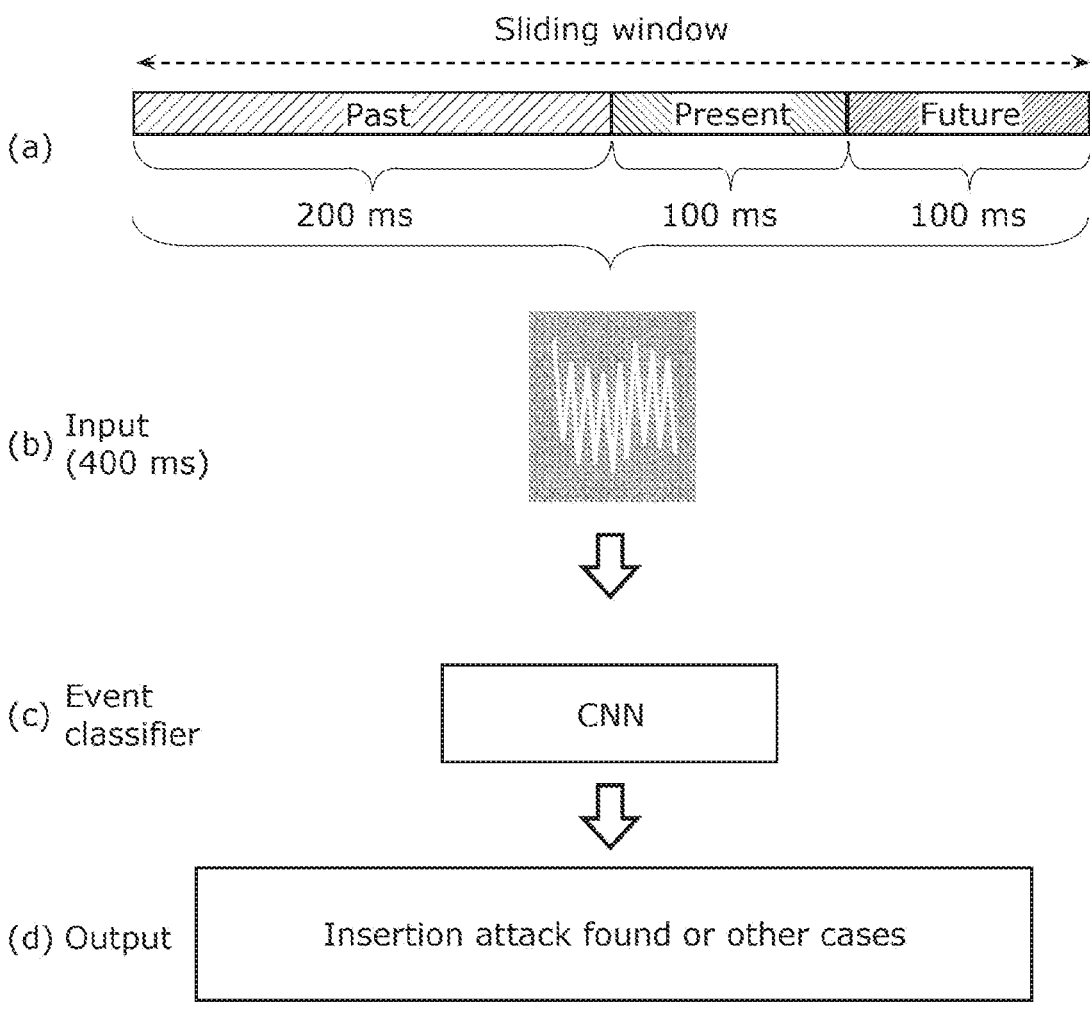
FIG. 13 is a diagram for conceptually describing the flow of processes performed by the trained CNN illustrated in FIG. 12.

FIG. 12 is a conceptual diagram of processes performed by trained CNN 121 according to Embodiment 1. FIG. 13 is a diagram for conceptually describing the flow of processes performed by trained CNN 121 illustrated in FIG. 12.

As illustrated in FIG. 12, when the image representing the reception interval between the plurality of messages included in the predetermined period or the image representing the transition of the sensor value of the plurality of messages included in the predetermined period is input, trained CNN 121 classifies the input image according to whether an insertion attack has been made on the plurality of messages included in the predetermined period that are included in the input image.

More specifically, first, as illustrated in (a) of FIG. 13, the message sequence received from the in-vehicle network is divided using the sliding window, and thus the plurality of messages included in the present sub-window are obtained. Next, in (b) of FIG. 13, image data of the reception interval between the plurality of messages included in the present sub-window or image data of the transition of the sensor value of the plurality of messages is generated and input to the event classifier. Subsequently, in (c) of FIG. 13, trained CNN 121 serving as the event classifier classifies the input image data according to whether an insertion attack has been made on the plurality of messages included in the predetermined period that are included in the input image data. Furthermore, in (d) of FIG. 13, trained CNN 121 outputs a detection result indicating whether or not an insertion attack has been made on the plurality of messages included in the present sub-window.

FIG. 14 is a diagram illustrating one example of the structure of CNN 121 according to Embodiment 1.

Specifically, CNN 121, which includes a plurality of convolutional layers, a plurality of pooling layers, a full connected layer, and a custom layer, for example, receives the image data and outputs the classification result. Note that the custom layer is used as a layer in which image segmentation is performed.

[1.2.3 Output Processor 13]

When the message sequence received from the in-vehicle network includes an attack message inserted in the predetermined period, output processor 13 outputs a detection result indicating that an insertion attack which is an insertion of an attack message has been made in the predetermined period. In other words, when event classification processor 12 detects an insertion attack in the predetermined period in the message sequence received from the in-vehicle network, output processor 13 outputs a detection result with an indication to that effect.

On the other hand, when event classification processor 12 detects no insertion attack in the predetermined period, output processor 13 outputs a detection result indicating that the plurality of messages included in the predetermined period are normal.

Note that when event classification processor 12 detects no insertion attack in the predetermined period, output processor 13 may further determine whether a replacement attack has been made on the plurality of messages included in the predetermined period. In this case, using a neural network model such as the CNN, for example, output processor 13 can determine whether a replacement attack has been made on the plurality of messages included in the predetermined period. Subsequently, when the plurality of messages included in the predetermined period include an anomalous message, it is sufficient that output processor 13 determine that a replacement attack has been made and output a detection result with an indication to that effect. On the other hand, when the plurality of messages included in the predetermined period do not include an anomalous message, it is sufficient that output processor 13 output a detection result indicating that the plurality of messages included in the predetermined period are normal.

[1.3 Operation of Anomaly Detection Device 10]

Next, the operation of anomaly detection device 10 configured as described above will be described.

Figure 15:
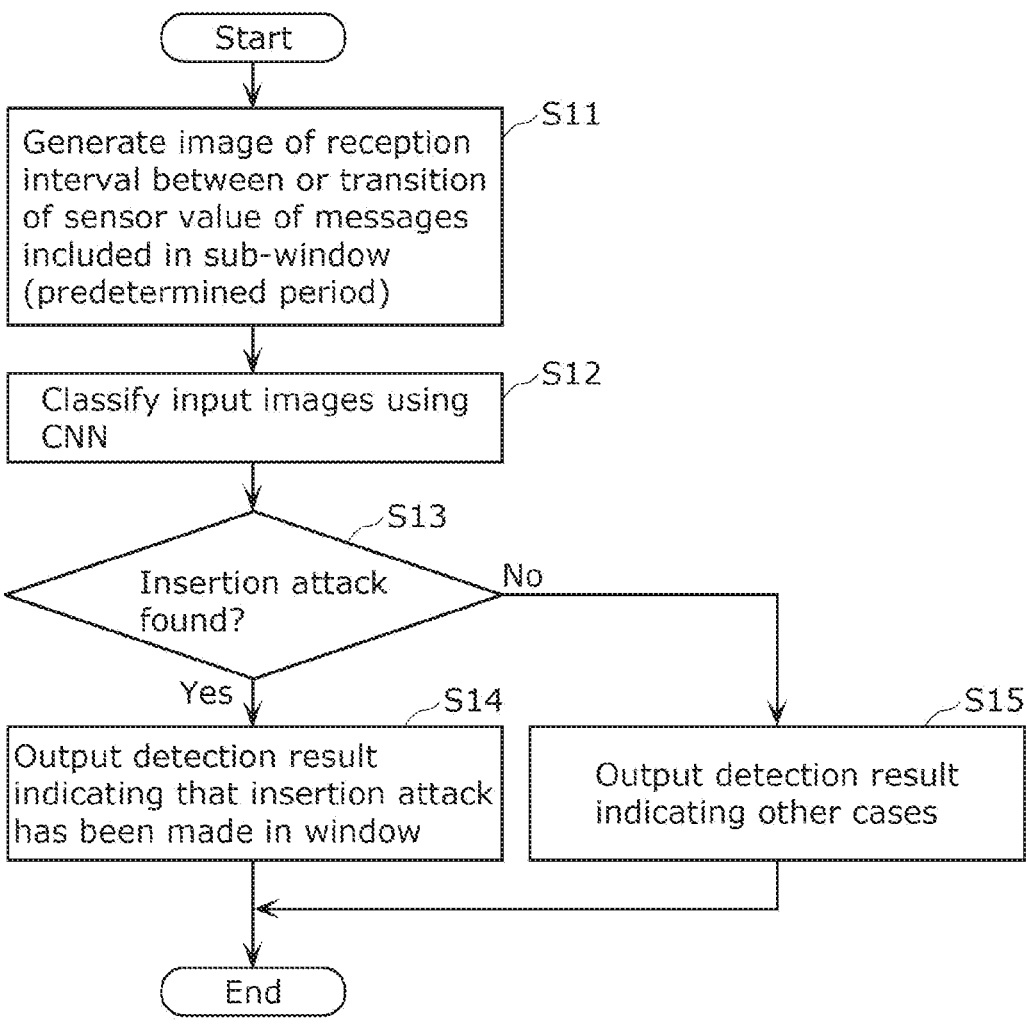
FIG. 15 is a flowchart illustrating the outline of operation of an anomaly detection device according to Embodiment 1.

FIG. 15 is a flowchart illustrating the outline of operation of anomaly detection device 10 according to Embodiment 1.

First, anomaly detection device 10 generates an image of the reception interval between of the messages included in the sub-window (the predetermined period) or an image of the transition of the sensor value of the messages (S11). In the present embodiment, anomaly detection device 10 generates image data of the reception interval between the plurality of messages included in the message sequence in the predetermined period out of the message sequence received from the in-vehicle network, or image data of the transition of the sensor value of the plurality of messages. Thus, anomaly detection device 10 can obtain an image representing the reception interval between the plurality of messages or the transition of the sensor value of the plurality of messages.

Next, anomaly detection device 10 classifies the input images using the CNN (S12). More specifically, using the trained CNN, anomaly detection device 10 classifies the images obtained in Step S11, each of which represents the reception interval between the plurality of messages or the transition of the sensor value of the plurality of messages, according to whether an attack message has been inserted thereto in the predetermined period.

Next, anomaly detection device 10 determines whether the result of the classification in Step S12 indicates that an insertion attack has been made (S13).

When the classification result indicates in Step S13 that an insertion attack has been made (Yes in S13), anomaly detection device 10 outputs a detection result indicating that an insertion attack has been made in the window (S14). Specifically, when there is an attack message inserted in the predetermined period, anomaly detection device 10 outputs a detection result indicating that an insertion attack which is an insertion of an attack message has been made in the predetermined period.

On the other hand, when the classification result does not indicate in Step S13 that an insertion attack has been made (No in S13), anomaly detection device 10 outputs a detection result indicating other cases including the case where no insertion attack has been made in the window (S15).

[1.4 Advantageous Effects, Etc.]

As described above, with anomaly detection device 10 and the anomaly detection method according to the present embodiment, because the reception interval between the messages or the sensor value of the messages is disturbed when an insertion attack occurs, it is possible to accurately detect an insertion attack in the message sequence in the predetermined period by using the image of the reception interval between the plurality of messages or the image of the transition of the sensor value of the plurality of messages. Furthermore, a disturbance in the reception interval between the messages or a disturbance in the sensor value of the messages that occurs at the time of an insertion attack is a phenomenon that cannot be forged no matter how sophisticated the cyberattack method becomes. Therefore, even when the cyberattack method becomes sophisticated, it is unlikely that an attack on the CAN bus is undetectable.

Thus, with anomaly detection device 10 and the anomaly detection method according to the present embodiment, an attack on the in-vehicle network can be accurately detected.

Furthermore, when the sliding window is used, the process of receiving the message sequence in the predetermined period can be made faster; thus, an insertion attack in the message sequence in the predetermined period can be detected with reduced time delay.

Embodiment 2

Embodiment 1 describes detecting an attack event on a window basis, specifically, detecting whether an insertion attack has been made on the message sequence in the predetermined period out of the message sequence received from the in-vehicle network; however, this is not limiting. When the attack event is detected on a window basis, whether each message is normal or anomalous may be further detected on a message basis. Specifically, when an insertion attack is detected in the message sequence in the predetermined period, whether each of the plurality of messages included in the message sequence is normal or anomalous may be further determined or detected. This case will be described below as Embodiment 2.

[2.1 Configuration of Anomaly Detection Device 10A]

Figure 16:
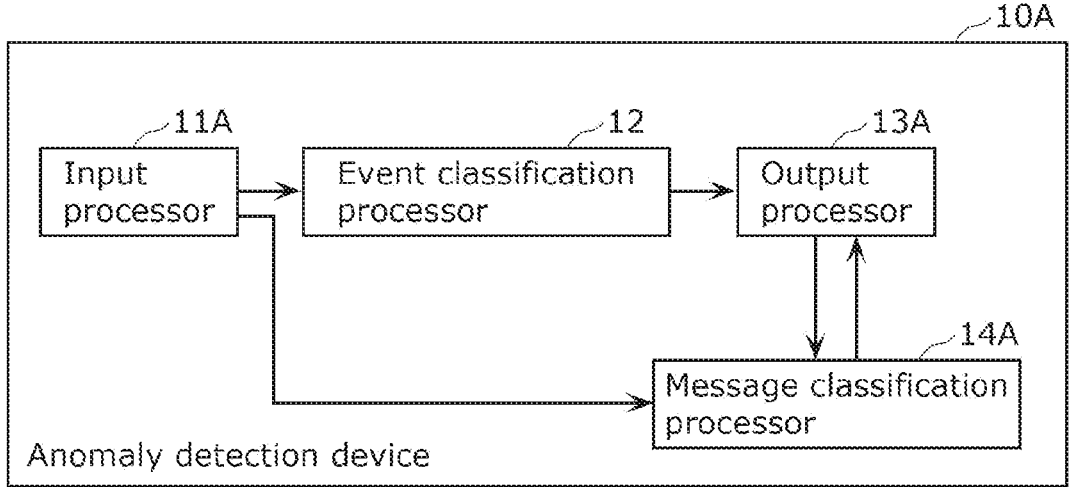
FIG. 16 is a block diagram illustrating one example of the configuration of an anomaly detection device according to Embodiment 2.

FIG. 16 is a block diagram illustrating one example of the configuration of anomaly detection device 10A according to Embodiment 2.

Anomaly detection device 10A according to the present embodiment includes input processor 11A, event classification processor 12, output processor 13A, and message classification processor 14A, as illustrated in FIG. 16. Note that elements substantially the same as those illustrated in FIG. 4 are assigned the same reference signs and detailed description thereof will be omitted.

[2.1.1 Input Processor 11A]

When the CAN data stream flowing in the in-vehicle network is input, input processor 11A obtains the plurality of messages. Input processor 11 generates image data of the reception interval between the plurality of messages obtained or image data of the transition of the sensor value of the plurality of messages obtained, and outputs the image data to event classification processor 12. Furthermore, input processor 11 outputs the plurality of messages obtained to message classification processor 14A.

More specifically, the CAN data stream flowing in the in-vehicle network is input, and thus input processor 11A receives the message sequence from the in-vehicle network. Input processor 11A obtains the plurality of messages included in the predetermined period by dividing, using the sliding window, the message sequence received from the in-vehicle network.

Input processor 11A generates, from the plurality of messages obtained that are included in the predetermined period, image data representing the reception interval between the plurality of messages or an image representing the transition of the sensor value of the plurality of messages, and outputs the image data or the image to event classification processor 12.

Furthermore, input processor 11A outputs the plurality of messages obtained that are included in the predetermined period to message classification processor 14A. Note that when event classification processor 12 detects an attack event, input processor 11A may output, to message classification processor 14A, the plurality of messages obtained that are included in the predetermined period.

[2.1.2 Output Processor 13A]

When event classification processor 12 detects an attack event, output processor 13 transmits an instruction to message classification processor 14A such that whether each message is normal or anomalous is detected on a message basis, and obtains a detection result from message classification processor 14A. In this case, it is sufficient that output processor 13 output a detection result indicating that an insertion attack which is an insertion of an attack message has been made in the predetermined period and that each message is normal or anomalous.

Note that the functions of output processor 13 for when event classification processor 12 detects no attack event, that is, when event classification processor 12 detects no insertion attack in the predetermined period, are as described in the embodiment; thus, description thereof will be omitted.

[2.1.3 Message Classification Processor 14A]

When event classification processor 12 detects an attack event on a window basis, message classification processor 14A detects, on a message basis, whether each message is normal or anomalous. More specifically, when event classification processor 12 detects an attack event on a window basis, message classification processor 14A receives the message sequence in the predetermined period that is input by input processor 11A. Message classification processor 14A detects whether each of the plurality of messages included in the received message sequence in the predetermined period is a normal message or an attack message.

Figure 17:
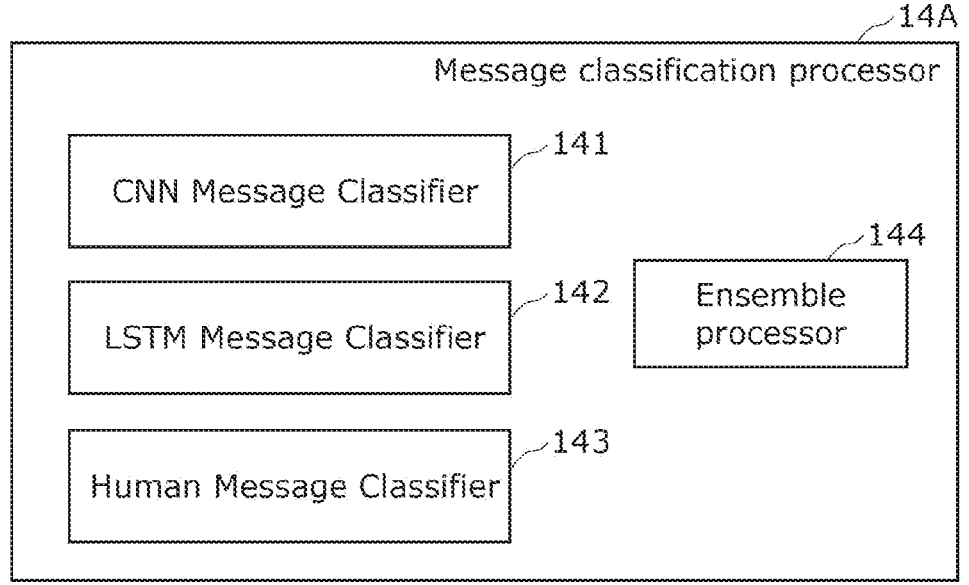
FIG. 17 is a block diagram illustrating one example of the detailed configuration of a message classification processor according to Embodiment 2.

FIG. 17 is a block diagram illustrating one example of the detailed configuration of message classification processor 14A according to Embodiment 2.

As illustrated in FIG. 17, message classification processor 14A according to the present embodiment includes CNN message classifier 141, LSTM message classifier 142, human message classifier 143, and ensemble processor 144.

[2.1.3.1 CNN Message Classifier 141]

When event classification processor 12 detects an attack event on a window basis, CNN message classifier 141 receives the message sequence in the predetermined period that is input by input processor 11A.

Using the trained CNN, CNN message classifier 141 detects, from the plurality of messages included in the received message sequence in the predetermined period, an attacked sensor and a message included in the plurality of messages that is an attack message.

This trained CNN, which is a CNN model different from CNN 121 according to Embodiment 1, is one example of the message classifier that classifies the plurality of messages included in the message sequence according to whether each of the plurality of messages included in the message sequence is an attack message or a normal message. The message classifier, which includes a plurality of convolutional layers, a plurality of pooling layers, and a full connected layer, for example, is trained using, as training data, a message sequence such as that illustrated in FIG. 7, for example.

Next, granularity of anomaly detection according to Embodiment 2 will be described with reference to FIG. 18.

Figure 18:
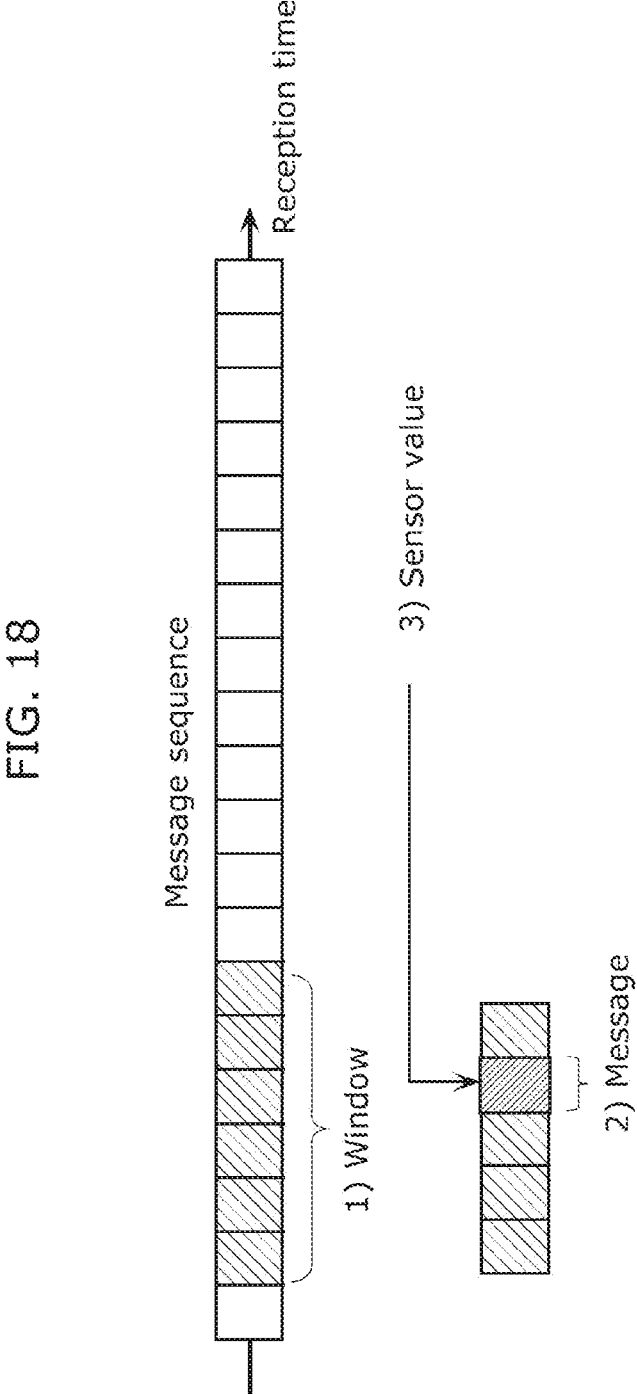
FIG. 18 is a diagram for conceptually describing granularity of anomaly detection according to Embodiment 2.

FIG. 18 is a diagram for conceptually describing granularity of anomaly detection according to Embodiment 2.

FIG. 18 illustrates, in the top stage, one example of the message sequence received from the in-vehicle network; the squares represent the messages.

First, anomaly detection device 10 according to Embodiment 2 detects whether there is an attack event on a window basis as a level of granularity indicated in 1), that is, in a predetermined segment (the predetermined period) of the message sequence. Next, anomaly detection device 10 detects whether each message is an attack message or a normal message on a message basis as a level of granularity indicated in 2), that is, whether the message included in the predetermined segment (each window) of the message sequence is an attack message or a normal message. Furthermore, anomaly detection device 10 detects whether each message is an attack message or a normal message on a sensor basis as a level of granularity indicated in 3), that is, using the sensor value included in the message. More specifically, when the message includes more than one sensor value, anomaly detection device 10 determines whether each sensor value indicates an attack or normality. On the other hand, when the message includes a single sensor value, anomaly detection device 10 can determine whether the message is an attack message or a normal message by determining whether the sensor value indicates an attack or normality.

In the present embodiment, CNN message classifier 141 detects whether each message is normal (a normal message) or anomalous (an attack message) on a message basis as a level of granularity indicated in 2) in FIG. 18.

Hereinafter, the processes performed by CNN message classifier 141 will be conceptually described with reference to FIG. 19, FIG. 20A, and FIG. 20B.

Figure 19:
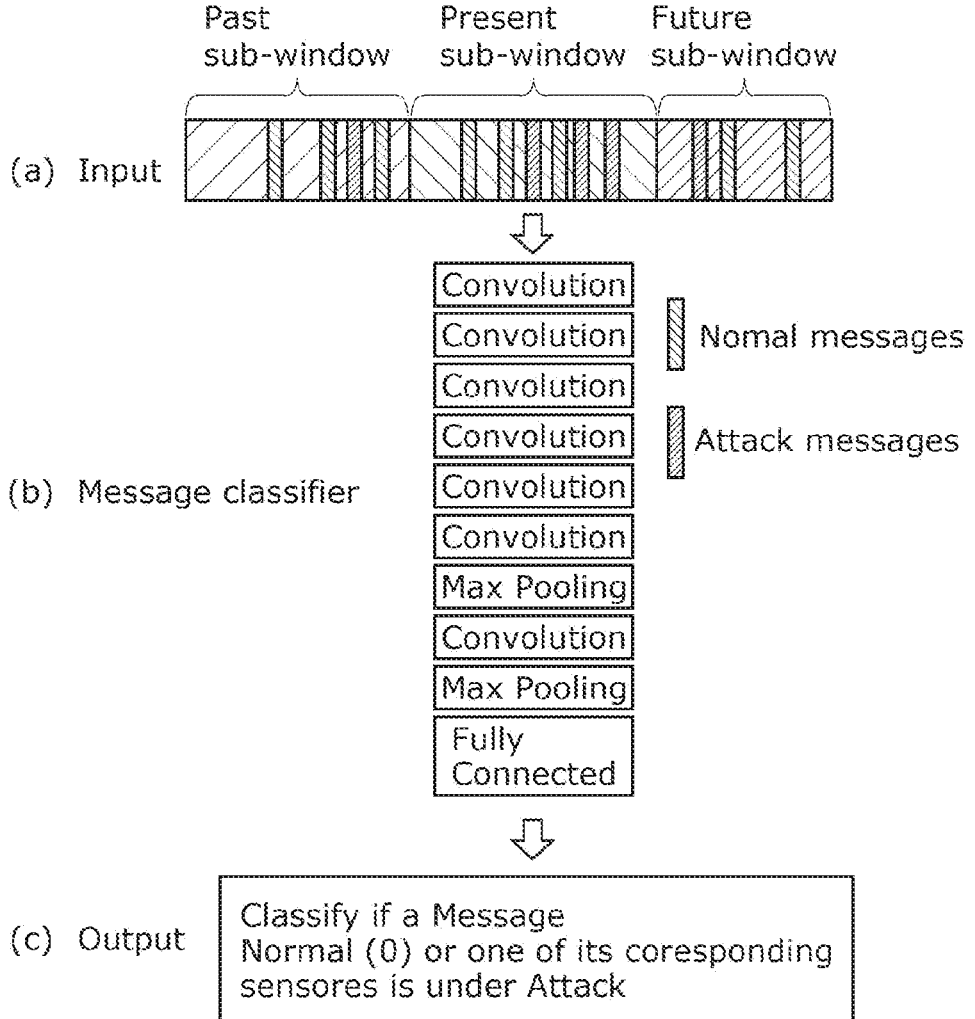
FIG. 19 is a diagram for conceptually describing the flow of processes performed by a CNN message classifier according to Embodiment 2.

FIG. 19 is a diagram for conceptually describing the flow of processes performed by CNN message classifier 141 according to Embodiment 2. FIG. 19 illustrates, in (a), a message sequence using substantially the same representation as in FIG. 7; the message sequence illustrated in (a) of FIG. 19 corresponds to the message sequence received from the in-vehicle network that is illustrated in (a) of FIG. 13.

First, as illustrated in (a) of FIG. 19, the message sequence received from the in-vehicle network is divided using the sliding window, and thus the plurality of messages included in the present sub-window are obtained and input to the trained CNN serving as the message classifier.

FIG. 20A is a diagram illustrating a specific example of feature amounts and the plurality of messages that are input to the message classifier according to Embodiment 2.

In the present embodiment, for example, 72 messages included in the present sub-window (one window) are input to the message classifier. Here each message includes a plurality of feature amounts. The feature amounts include, as one or more sensor values, a sensor value and a value indicating the reception interval between the messages. Examples of the sensor value include a sensor value indicating a vehicle speed obtained by a vehicle speed sensor, a sensor value indicating a steering angle obtained by a steering angle sensor, and a sensor value indicating acceleration obtained by an acceleration sensor, as indicated in FIG. 20A. The sensor value and the value indicating the reception interval between the messages may be collectively referred to as message feature amounts.

Next, in (b) of FIG. 19, the trained CNN serving as the message classifier classifies the plurality of messages included in the received message sequence according to whether each message is normal or anomalous. Note that the anomalous message includes a sensor value obtained by a sensor under attack and a sensor value that is anomalous, and therefore is referred to as an attack message in the present embodiment.

In (c) of FIG. 19, the trained CNN serving as the message classifier outputs a detection result indicating whether each of the plurality of messages included in the present sub-window is a normal message or an attack message.

FIG. 20B is a diagram illustrating a specific examples of determination results from the message classifier according to Embodiment 2. In the example illustrated in FIG. 20A, the value of the speed in message No. 3, that is, 80 km/h, is considered to indicate an anomaly, and the other sensor values are considered as normal. In this case, the trained CNN serving as the message classifier classifies message No. 3 as anomalous, as illustrated in FIG. 20B, and furthermore, sensor ID (index) indicating a speed sensor that has output the value of the speed in message No. 3, for example, 2, is included in the determination result to be output.

Note that when one message includes sensor values obtained from two or more sensors, the trained CNN serving as the message classifier cannot determine, on a sensor basis, whether the message is anomalous or normal. Whether one message includes sensor values obtained from two or more sensors varies depending on the type of vehicle.

Figure 21:
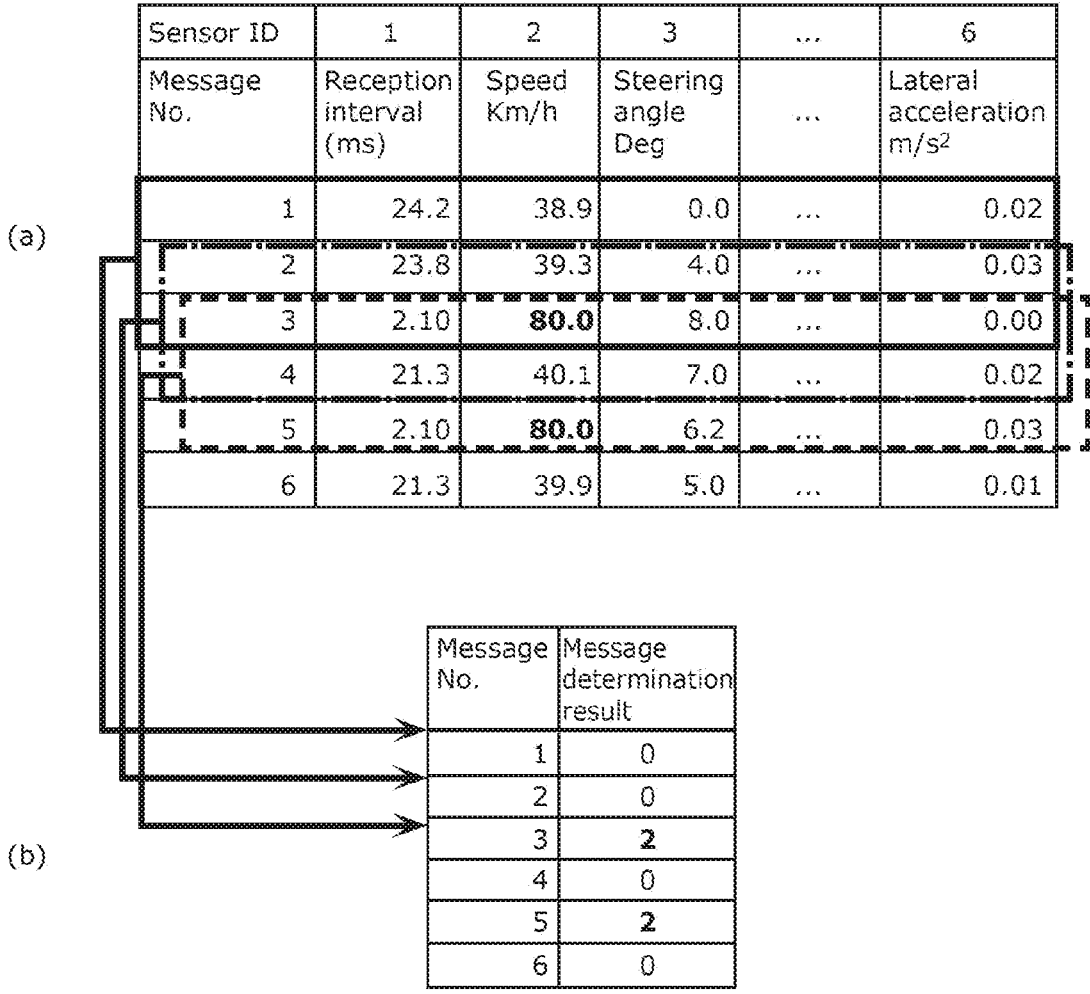
FIG. 21 is a diagram for conceptually describing a feature extraction process performed by a message classifier according to Embodiment 2.

FIG. 21 is a diagram for conceptually describing a feature extraction process performed by a message classifier according to Embodiment 2. FIG. 21 illustrates, in (a), a specific example of the feature amounts and the plurality of messages that are input to the message classifier, similar to FIG. 20A. FIG. 21 illustrates, in (b), determination results obtained as a result of convolution performed using a predetermined small filter on the plurality of messages included in the present sub-window.

In (a) of FIG. 21, the trained CNN serving as the message classifier performs convolution on message No. 1 among messages No. 1 to No. 3, for example, message No. 2 among messages No. 2 to No. 4, for example, and message No. 3 among messages No. 3 to No. 5, for example. As a result of performing such a feature extraction process, the trained CNN serving as the message classifier outputs a determination result (a classification result) indicating that messages No. 3 and No. 5 are anomalous and furthermore, the speed sensor denoted as sensor ID 2, for example, is under attack.

[2.1.3.2 LSTM Message Classifier 142]

When event classification processor 12 detects an attack event on a window basis, LSTM message classifier 142 receives the message sequence in the predetermined period that is input by input processor 11A.

Using the trained LSTM, LSTM message classifier 142 detects, from the plurality of messages included in the received message sequence in the predetermined period, whether the plurality of messages are attack messages.

This trained LSTM may be BLSTM. This trained LSTM is one example of the message classifier that classifies, based on the message sequence, the plurality of messages included in the message sequence according to whether each of the plurality of messages is an attack message or a normal message. This message classifier is trained using, as training data, a message sequence such as that illustrated in FIG. 7, for example.

Hereinafter, the processes performed by LSTM message classifier 142 will be conceptually described with reference to FIG. 22, FIG. 23A, and FIG. 23B.

Figure 22:
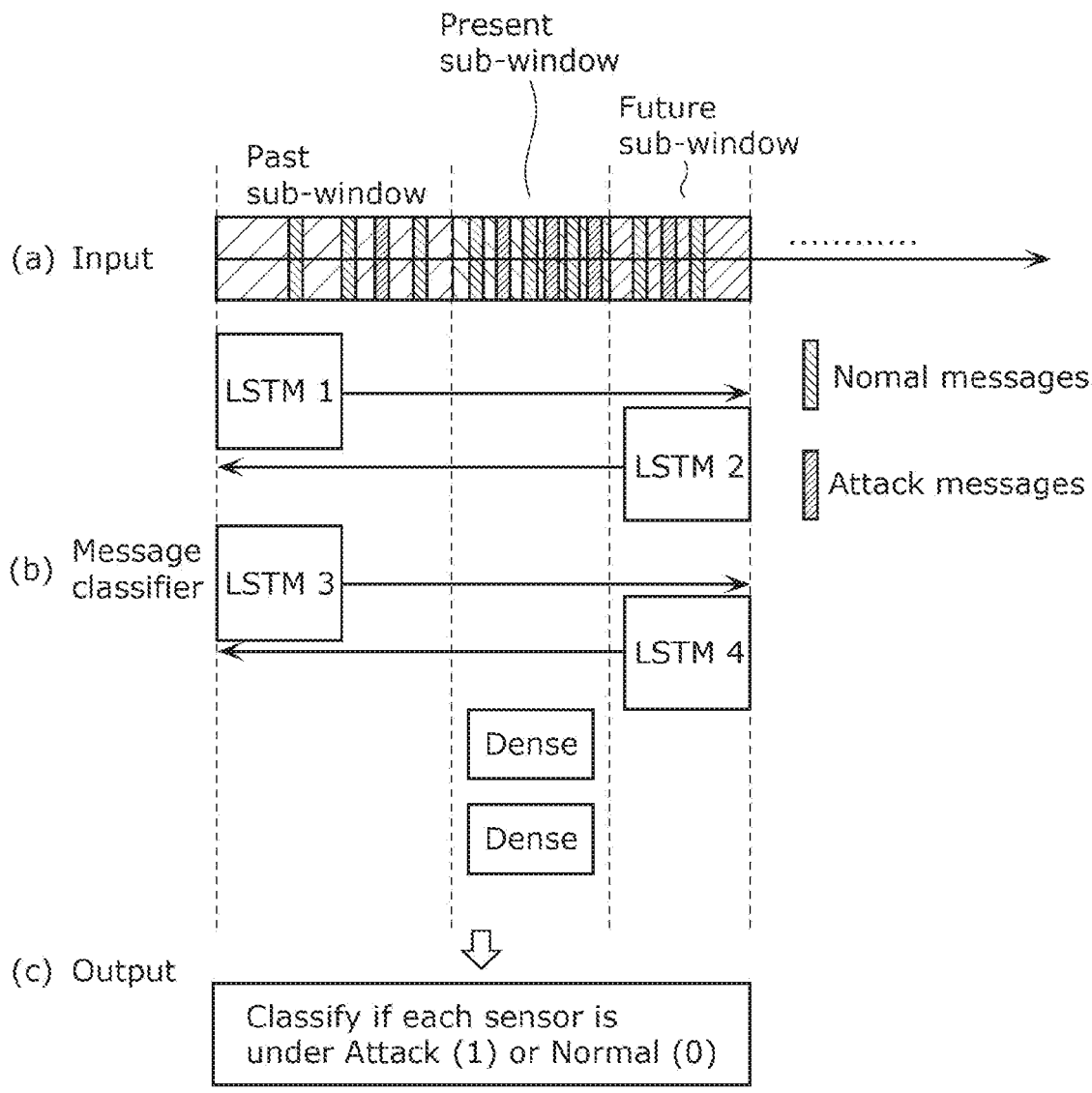
FIG. 22 is a diagram for conceptually describing the flow of processes performed by a LSTM message classifier according to Embodiment 2.

FIG. 22 is a diagram for conceptually describing the flow of processes performed by LSTM message classifier 142 according to Embodiment 2. In FIG. 22, (a) is the same as the diagram illustrated in (a) of FIG. 19; the message sequence illustrated in (a) of FIG. 19 corresponds to the message sequence received from the in-vehicle network that is illustrated in (a) of FIG. 13. FIG. 22 illustrates, in (b), an example where the LSTM serving as the message classifier is BLSTM. The trained BLSTM serving as the message classifier is formed by stacking two BLSTM layers and two Dense layers.

First, as illustrated in (a) of FIG. 22, the message sequence received from the in-vehicle network is divided using the sliding window, and thus the plurality of messages included in the present sub-window are obtained and input to the BLSTM serving as the message classifier.

FIG. 23A is a diagram illustrating a specific example of the feature amounts and the plurality of messages that are input to the message classifier according to Embodiment 2. Note that FIG. 23A is the same diagram as FIG. 20A and therefore, description thereof will be omitted. Furthermore, the absence of a sensor value may also be included as a feature amount although not indicated in FIG. 23A. In this case, an absence of a sensor value may be denoted as 1, and no absence of sensor values may be denoted as 0.

Next, in (b) of FIG. 22, the trained BLSTM serving as the message classifier classifies the plurality of messages included in the received message sequence according to whether each of the plurality of messages is normal or anomalous.

In (c) of FIG. 22, the trained BLSTM serving as the message classifier outputs a detection result indicating whether each of the plurality of messages included in the present sub-window is a normal message or an attack message.

FIG. 23B is a diagram illustrating a specific example of determination results from the message classifier according to Embodiment 2. In the example illustrated in FIG. 23A, the value of the speed in message No. 3, that is, 80 km/h, indicates an anomaly, and the other sensor values are normal. In this case, the trained BLSTM serving as the message classifier outputs a determination result including, in addition to the numbers of sensors and messages that are subject to the detection, results obtained by classifying an attacked sensor as value 1 and classifying a normal sensor as value 0, for example, as illustrated in FIG. 23B.

[2.1.3.3 Human Message Classifier 143]

When event classification processor 12 detects an attack event on a window basis, human message classifier 143 receives the message sequence in the predetermined period that is input by input processor 11A.

By referring to the sensor values included in each of the plurality of messages included in the received message sequence in the predetermined period, human message classifier 143 determines, on the basis of a predetermined rule, whether the plurality of messages are attack messages.

The predetermined rule is based on human intuition that is effective in message level classification. For example, as mentioned above, in the case of an insertion attack, an attack message is inserted into a normal message sequence and therefore, the reception interval in an anomalous message sequence including the attack message is disturbed. Furthermore, a sensor value included in an attack message represented by an attack on speeds such as a vehicle speed, for example, deviates from a sensor value included in a normal message sequence. Specifically, when attack messages and normal messages included in a normal message sequence are clustered, coprime groups are formed. Stipulating such human intuition in the rule in advance allows human message classifier 143 to determine, from the sensor values included in each of the plurality of messages included in the message sequence in the predetermined period, whether the plurality of messages are attack messages.

Note that there are cases where a sensor value included in an attack message has the same value as that included in a normal message. An attack with an attack message having the same sensor value as that included in a normal message will be referred to as an equivalence attack. An attack with an attack message having a sensor value different from that included in a normal message will be referred to as a shift attack. Hereinafter, human intuition that is effective in message level classification for equivalence attacks will be described.

Figure 24:
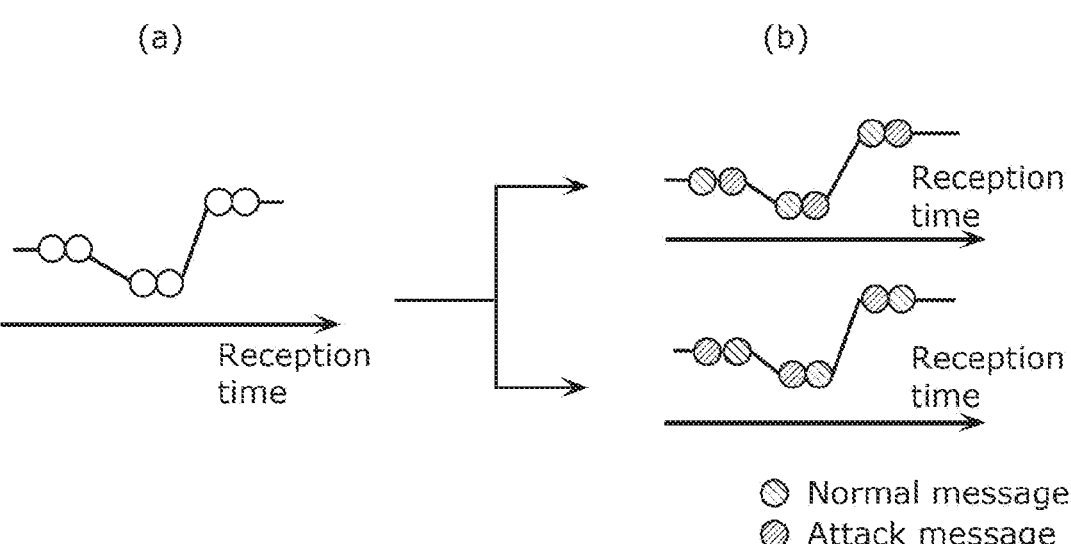
FIG. 24 is a diagram for describing problems with message level classification for equivalence attacks and measures to address said problems.

FIG. 24 is a diagram for describing problems with the message level classification for equivalence attacks and measures to address said problems. In (a) and (b) of FIG. 24, the vertical direction indicates sensor values, and the horizontal direction indicates reception time.

As illustrated in (a) of FIG. 24, when an equivalence attack occurs, the reception interval in an anomalous message sequence is still disturbed and therefore, the equivalence attack is detected as an insertion attack. However, it is not known whether the anomalous message sequence has the arrangement illustrated in the top stage in (b) of FIG. 24 or the arrangement illustrated in the bottom stage in (b) of FIG. 24. This means that when an equivalence attack occurs, the equivalence attack is detected as an insertion attack, but it is likely that a normal message is erroneously detected as an anomalous message due to a failure to distinguish between a normal message and an attack message.

On the other hand, when an equivalence attack occurs, side effects on the vehicle are minor while the reception interval in the message sequence is disturbed.

The foregoing leads to the intuition that an attack message determined as an equivalence attack does not need to be subject to the anomaly detection. Thus, when an insertion attack is detected, the difference between each sensor value and the sensor value of the immediately preceding message is calculated to determine whether the attack is an equivalence attack.

Figure 25:
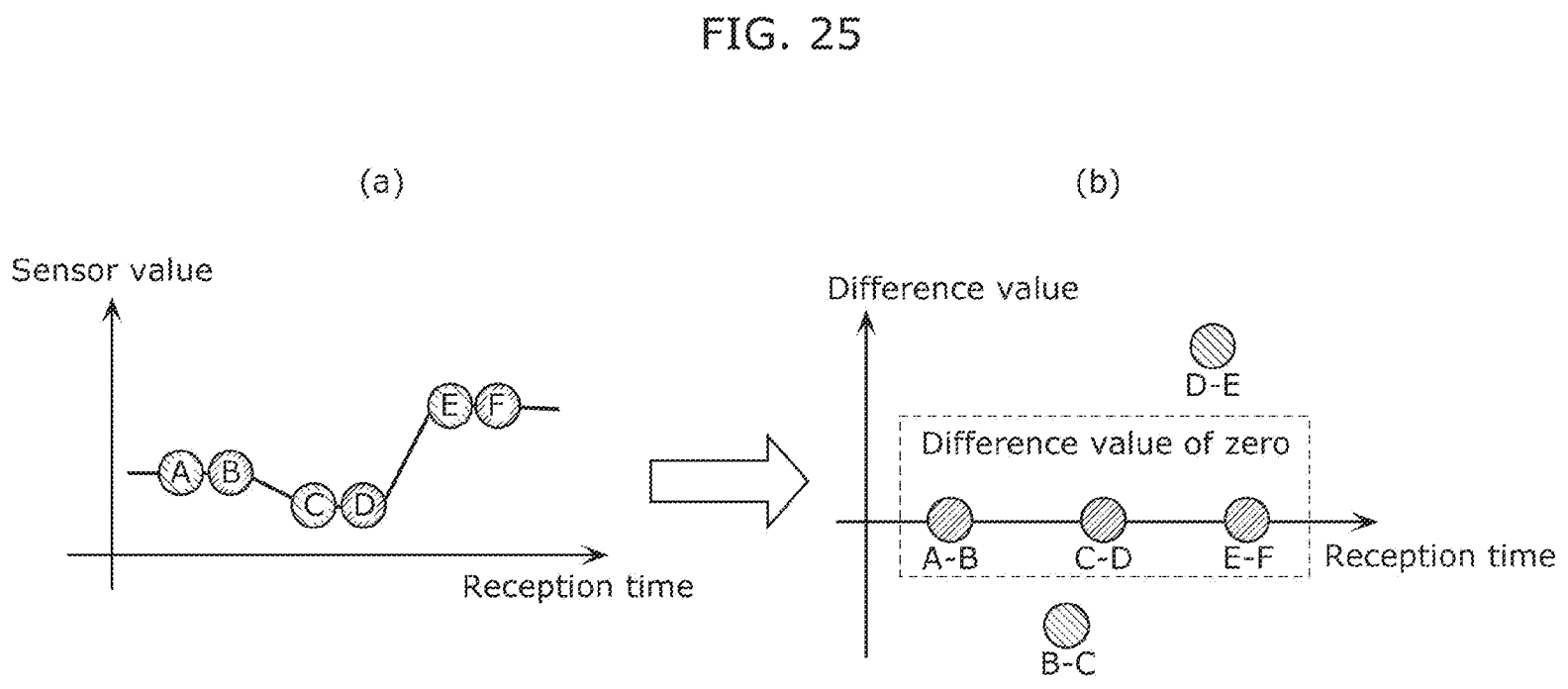

FIG. 25 is a diagram for conceptually describing that whether an attack is an equivalence attack can be determined by calculating the difference between sensor values of messages in a message sequence.

FIG. 25 illustrates, in (a), a message sequence under an equivalence attack. Assume that attack messages are denoted as B, D, and F in circles and normal messages are denoted as A, C, and E in circles.

In this case, as illustrated in (b) of FIG. 25, the difference value between A and B, the difference value between C and D, and the difference value between E and F are zero (0); since the difference value continues to be 0, it can be determined that this is under an equivalence attack. Thus, the messages in the message sequence denoted as A to F may be determined as normal messages.

In other words, even when an insertion attack is detected, the difference between each sensor value and the sensor value of the immediately preceding message is calculated, and when the difference continues to be 0 and the attack is determined as an equivalence attack, the attack message determined as an equivalence attack may be determined as a normal message. Conversely, when the difference is not 0, the attack is not an equivalence attack, and therefore the message may be made subject to the anomaly detection, and ensemble processor 144, which will be described later, may use results from other message classifiers.

More specifically, first, human message classifier 143 calculates difference values between sensor values of all the combinations of two messages that are sequential in the reception time among the plurality of messages included in the received message sequence in the predetermined period. Next, human message classifier 143 combines the messages into groups according to the calculated difference values and determines whether all of the difference values in each resulting group are 0.

When not all of the difference values are 0, human message classifier 143 outputs a detection result indicating that an insertion attack which is an insertion of an attack message has been made on the received message sequence in the predetermined period. On the other hand, when all of the difference values are 0, it is assumed that, in the received message sequence in the predetermined period, a message in the group where the difference value is 0 is not an attack message, and human message classifier 143 outputs the detection result.

[2.1.3.4 Ensemble Processor 144]

An ensemble process, which is a method used in machine learning, makes it possible to output a prediction result obtained by combining advantages of different models while minimizing variations in prediction results of the different models.

In the present embodiment, ensemble processor 144 stacks and outputs a detection result of CNN message classifier 141, a detection result of LSTM message classifier 142, and a determination result of human message classifier 143. Note that ensemble processor 144 may select and output one of the detection result of CNN message classifier 141, the detection result of LSTM message classifier 142, and the determination result of human message classifier 143.

More specifically, first, ensemble processor 144 obtains the detection result of CNN message classifier 141. In other words, using another trained CNN different from the aforementioned trained CNN, ensemble processor 144 obtains, from the plurality of messages included in the message sequence in the predetermined period, a first detection result indicating, among the plurality of messages, a message that is an attack message, and a sensor that has been attacked. Furthermore, ensemble processor 144 obtains the detection result of LSTM message classifier 142. In other words, using the trained LSTM, ensemble processor 144 obtains, from the plurality of messages included in the message sequence in the predetermined period, a second detection result indicating whether the plurality of messages are attack messages.

Furthermore, ensemble processor 144 obtains the determination result of human message classifier 143. In other words, ensemble processor 144 obtains the determination result obtained by determining, from the sensor values included in each of the plurality of messages included in the message sequence in the predetermined period, whether the plurality of messages are attack messages, on the basis of the predetermined rule.

Next, ensemble processor 144 performs an ensemble process on the obtained determination result, the obtained first detection result, and the obtained second detection result, and outputs a result. In the ensemble process, ensemble processor 144 selects one of the determination result, the first detection result, and the second detection result or calculates a weighted average of the obtained determination result, the obtained first detection result, and the obtained second detection result to integrate these results.

[2.2 Operation of Anomaly Detection Device 10A]

Next, the operation of anomaly detection device 10A configured as described above will be described.

US 12,665,913 B2

21

Figure 26:
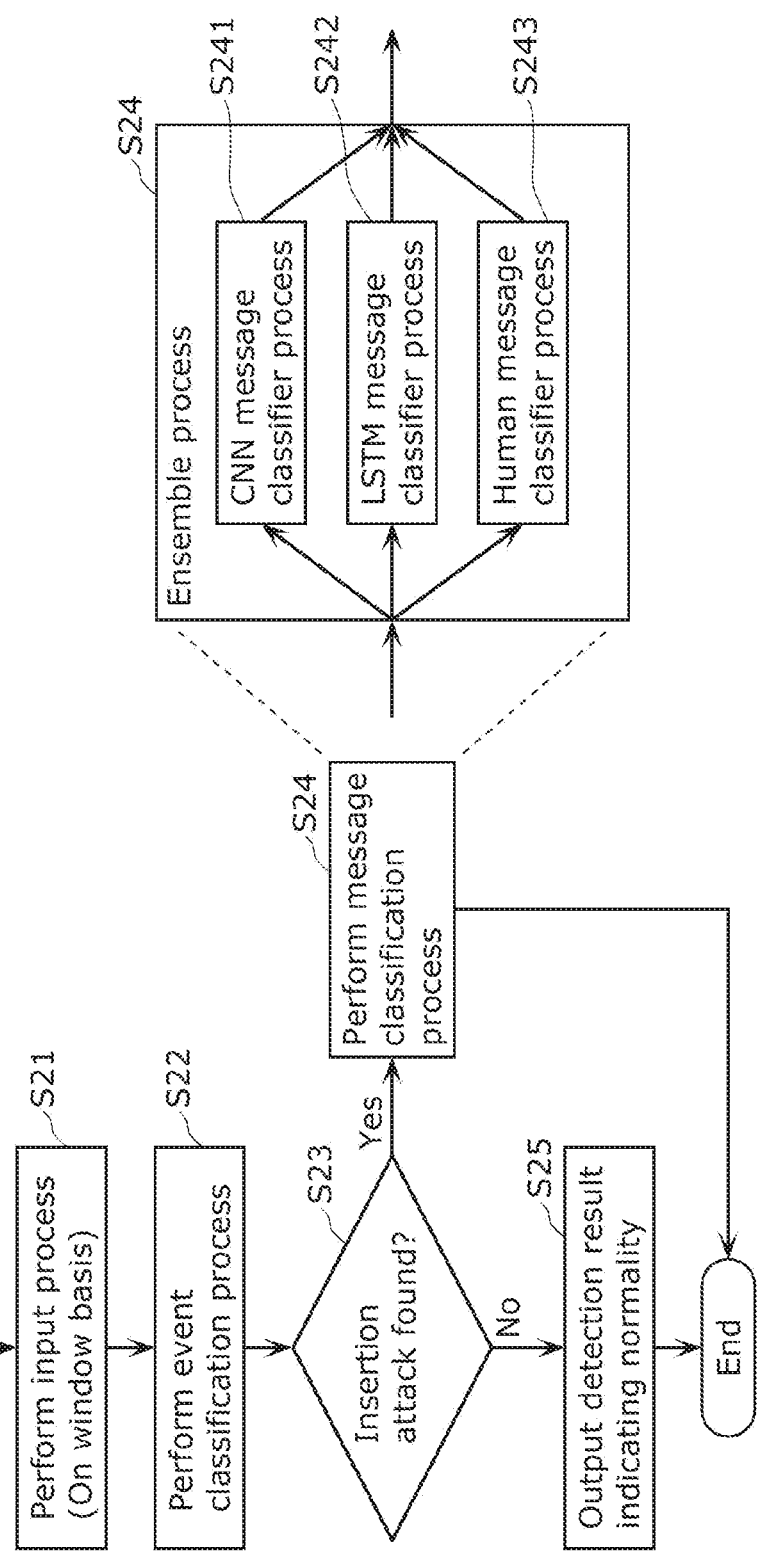
FIG. 26 is a flowchart illustrating the outline of operation of an anomaly detection device according to Embodiment 2.

FIG. 26 is a flowchart illustrating the outline of operation of anomaly detection device 10A according to Embodiment 2.

First, anomaly detection device 10A performs an input process on a window basis (S21). More specifically, anomaly detection device 10A obtains a plurality of messages included in the present sub-window (the predetermined period) by dividing, using the sliding window, the message sequence received from the in-vehicle network. Anomaly detection device 10A generates, from the plurality of messages obtained that are included in the predetermined period, image data representing the reception interval between the plurality of messages or an image representing a transition of the sensor value of the plurality of messages.

Next, anomaly detection device 10A performs an event classification process (S22). More specifically, using trained CNN 121, anomaly detection device 10A classifies the image generated in the input process performed in Step S21, which represents the reception interval between the plurality of messages or the transition of the sensor value of the plurality of messages, according to whether an attack event that is an insertion of an attack message has been made in the predetermined period.

Next, anomaly detection device 10 determines whether the classification result of the event classification process performed in Step S22 indicates that an insertion attack has been made (S23).

When the classification result indicates in Step S23 that an insertion attack has been made (Yes in S23), anomaly detection device 10A further performs a message classification process (S24). More specifically, anomaly detection device 10A performs the process of detecting whether each of the plurality of messages included in the received message sequence in the predetermined period is a normal message or an attack message.

The detailed processing in Step S24 will be described below.

In Step S24, first, anomaly detection device 10A performs a CNN message classifier process (S241), a LSTM message classifier process (S242), and a human message classifier process (S243). Note that the CNN message classifier process is performed by CNN message classifier 141 described above, the LSTM message classifier process is performed by LSTM message classifier 142, and thus detailed description thereof will be omitted. Similarly, the human message classifier process is performed by human message classifier 143 described above. Detailed description thereof will be described later.

Next, anomaly detection device 10A performs an ensemble process on the first detection result obtained in Step S241, the second detection result obtained in Step S242, and the determination result obtained in Step S243, and outputs a result.

Referring back to FIG. 26, the description will be continued.

On the other hand, when the classification result does not indicate in Step S23 that an insertion attack has been made (No in S23), anomaly detection device 10A outputs a detection result indicating that no insertion attack has been made on the received message sequence in the predetermined period, in other words, a detection result indicating that the received message sequence in the predetermined period is normal (S25).

Figure 27:
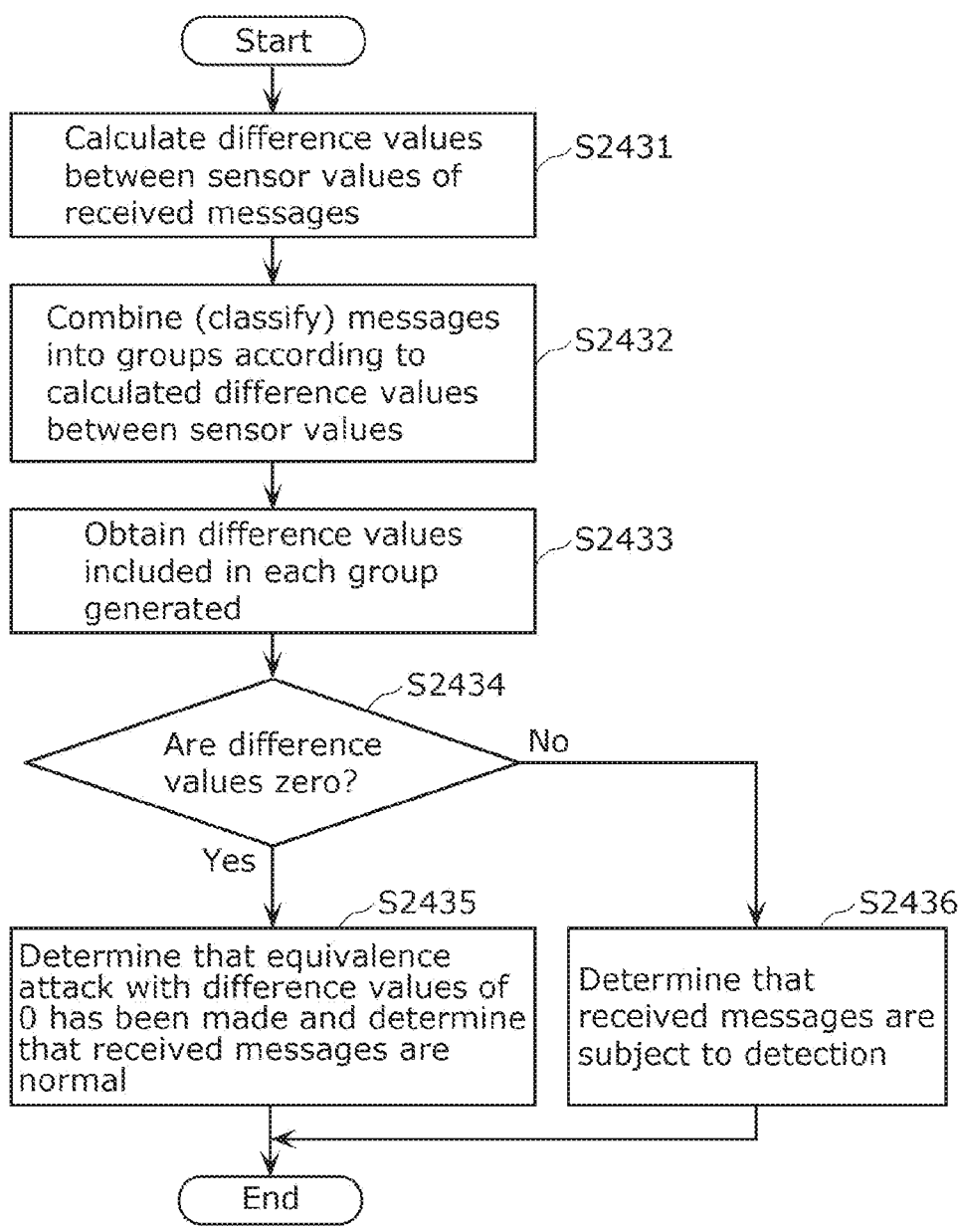
FIG. 27 is a flowchart illustrating one example of the detailed processing in Step S243 indicated in FIG. 26.

FIG. 27 is a flowchart illustrating one example of the detailed processing in Step S243 indicated in FIG. 26.

In FIG. 27, first, anomaly detection device 10A calculates difference values between the sensor values of the received messages (S2431). More specifically, anomaly detection device 10A calculates difference values between sensor values of all the combinations of two messages that are sequential in the reception time among the plurality of messages included in the present sub-window (the predetermined period) obtained in the input process performed in Step S21.

Next, anomaly detection device 10A combines (classifies) the messages into groups according to the difference values between the sensor values calculated in Step S2431 (S2432). More specifically, anomaly detection device 10A generates groups by combining the difference values between the sensor values of all the combinations of two messages that are sequential in the reception time that have been calculated in Step S2431.

Next, anomaly detection device 10A obtains the difference values included in each group generated in Step S2432 (S2433).

Next, anomaly detection device 10A determines whether the difference values included in each group that have been obtained in Step S2433 are 0 (S2434).

When the difference values included in the group are 0 in Step S2434 (Yes in S2434), anomaly detection device 10A determines that an equivalence attack with difference values of 0 has been made and determines that the received messages included in the group are normal (S2435). More specifically, when the difference values included in the group are 0, anomaly detection device 10A determines that all of the plurality of the messages included in the group are normal.

On the other hand, when the difference values included in the group are not 0 in Step S2434 (No in S2434), anomaly detection device 10A determines that the received messages included in the group are subject to the detection (S2436). More specifically, when the difference values included in the group are not 0, it is assumed that the plurality of messages included in the group are likely to include an attack message, and anomaly detection device 10A determines that the plurality of messages included in the group are subject to the detection.

In this manner, when an equivalence attack occurs, this attack is detected as an insertion attack, but is handled as a normal message because this attack has only minor side effects on the vehicle; thus, the occurrence of normal messages being erroneously detected as attack messages is reduced.

[2.3 Advantageous Effects, Etc.]

As described above, with anomaly detection device 10 and the anomaly detection method according to the present embodiment, an attack on the in-vehicle network is detected in two stages: it is detected whether there is an attack event in the message sequence in the predetermined period; and when there is an attack event, an attack message is detected. This makes it possible to accurately detect an attack on the in-vehicle network.

More specifically, in the stage in which an attack message is detected, the detection that uses the trained CNN, the detection that uses the trained LSTM, and the detection that is based on the predetermined rule are performed in parallel, and the ensemble process is performed on the results; thus, the detection through a neural network model and the detection based on a rule can be combined.

This allows the rate of erroneous detection of an attack message to approach zero; thus, an attack on the in-vehicle network can be accurately detected.

[Variation]

Note that the present variation describes the case where human message classifier 143 determines, on the basis of a rule in which clustering and regression are used as another example of the predetermined rule described above, whether each of the plurality of messages included in the message sequence in the predetermined period is an attack message. In other words, anomaly detection device 10A may perform the detailed processing indicated in FIG. 28, which will be described below, instead of the detailed processing indicated in FIG. 27 as the detailed processing in Step S243 indicated in FIG. 26.

Figure 28:
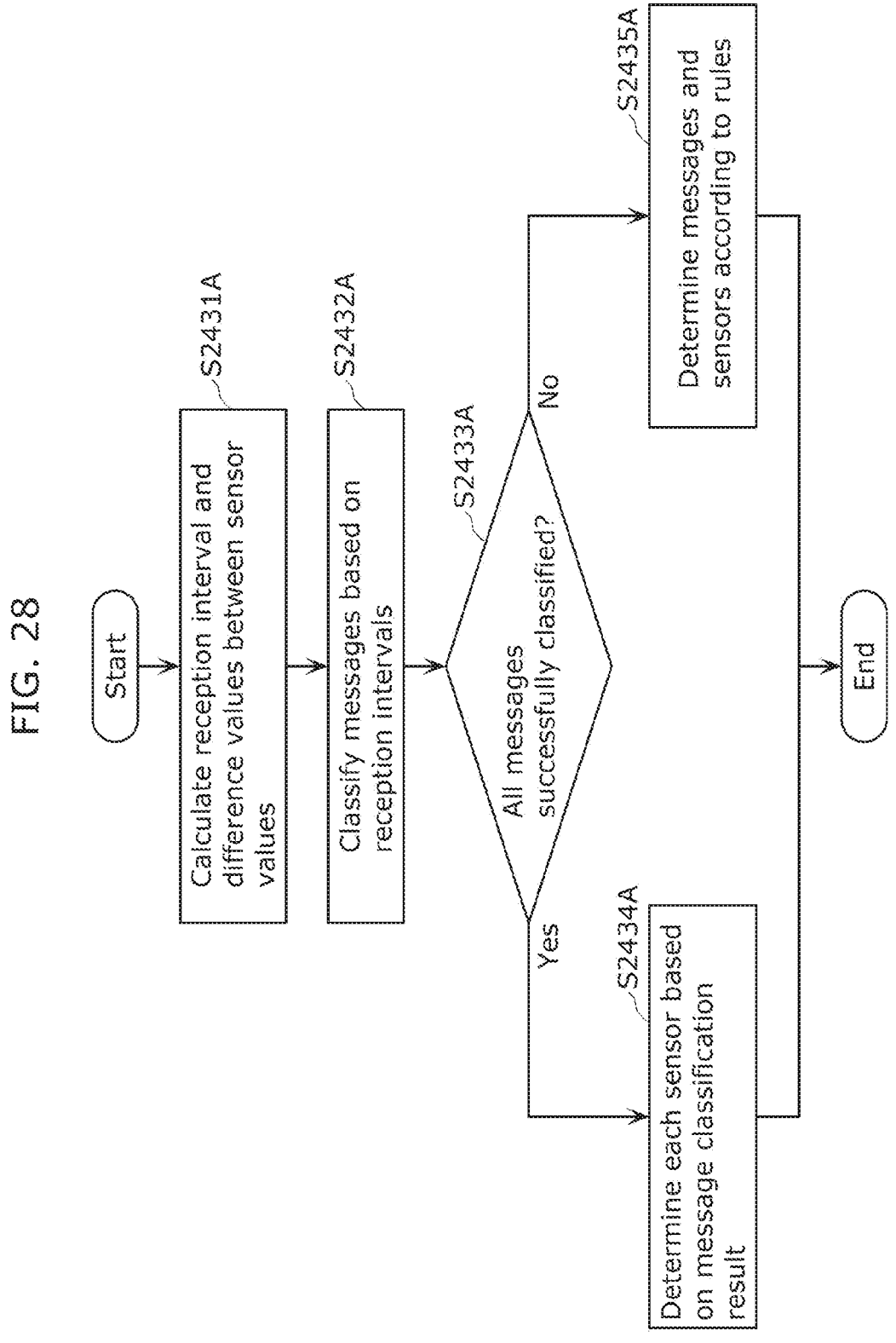
FIG. 28 is a flowchart illustrating another example of the detailed processing in Step S243 indicated in FIG. 26.

FIG. 28 is a flowchart illustrating another example of the detailed processing in Step S243 indicated in FIG. 26.

In FIG. 28, first, anomaly detection device 10A calculates the reception interval and difference values between the sensor values (52431A). More specifically, anomaly detection device 10A calculates the reception interval between the plurality of messages included in the present sub-window (the predetermined period) obtained in the input process performed in Step S21 and difference values between the sensor values of all the combinations of two messages that are sequential in the reception time among the plurality of messages.

Next, anomaly detection device 10A classifies the messages on the basis of the reception interval calculated in Step S2431A (52432A). More specifically, on the basis of the reception interval calculated in Step S2431A, anomaly detection device 10A classifies the plurality of messages included in the predetermined period into normal messages and anomalous messages.

Next, anomaly detection device 10A determines whether all the messages included in the predetermined period are successfully classified in Step S2432A (52433A).

When all the messages are successfully classified in Step S2433A (Yes in S2433A), anomaly detection device 10A determines each sensor on the basis of the result of the message classification performed in Step S2432A (52434A).

Figure 29:
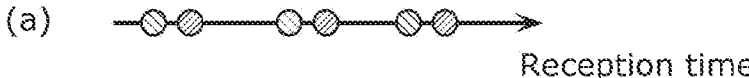
FIG. 29 is a diagram illustrating one example of anomalous message sequences according to a variation of Embodiment 2 in the case where all messages included in a predetermined period can be classified on the basis of reception intervals.
Figure 30:
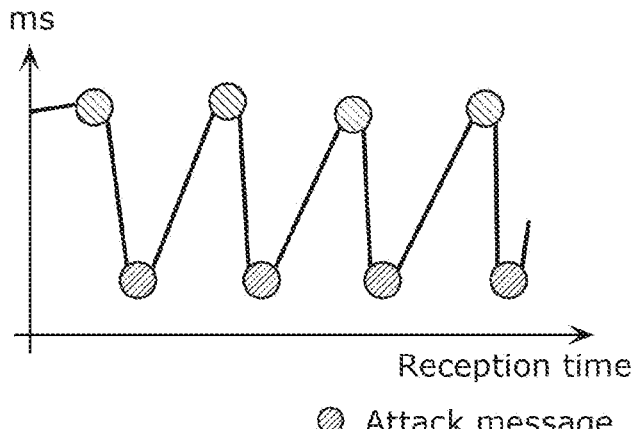
FIG. 30 is a diagram illustrating one example of a classification result for an anomalous message sequence according to a variation of Embodiment 2 in the case where all messages included in a predetermined period are successfully classified on the basis of reception intervals.

With reference to FIG. 29 and FIG. 30, the following conceptually describes the case where all the messages included in the predetermined period can be classified into normal messages and anomalous messages (attack messages) on the basis of the reception interval between the messages.

FIG. 29 is a diagram illustrating one example of anomalous message sequences according to a variation of Embodiment 2 in the case where all the messages included in the predetermined period can be classified on the basis of the reception interval. FIG. 29 illustrates, in (a), the case where an attack message is inserted immediately after a normal message. FIG. 29 illustrates, in (b), the case where an attack message is inserted immediately before a normal message.

FIG. 30 is a diagram illustrating one example of a classification result for an anomalous message sequence according to a variation of Embodiment 2 in the case where all the messages included in the predetermined period are successfully classified on the basis of the reception interval.

In the cases illustrated in (a) and (b) of FIG. 29, the reception interval between an attack message and a normal message is anomalous. The reception interval between normal messages is known. Thus, all the messages can be classified into attack messages and normal messages on the basis of the reception interval, as illustrated in FIG. 30, for example.

On the other hand, when the classification of all the messages is not successful in Step S2433A (No in S2433A), anomaly detection device 10A determines, according to a plurality of rules, the sensors and the messages included in the predetermined period (S2435A).

Figure 31:
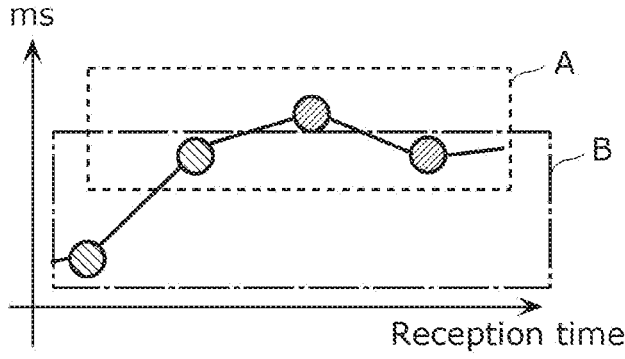
FIG. 31 is a diagram illustrating one example of a classification result for an anomalous message sequence according to a variation of Embodiment 2 in the case where classification of all messages included in a predetermined period on the basis of reception intervals is unsuccessful.

With reference to FIG. 31, the following conceptually describes the case where the classification of all the messages included in the predetermined period into normal messages and attack messages on the basis of the reception interval between the messages is unsuccessful.

FIG. 31 is a diagram illustrating one example of a classification result for an anomalous message sequence according to a variation of Embodiment 2 in the case where the classification of all the messages included in the predetermined period on the basis of the reception interval is unsuccessful.

For example, when an attack message is not inserted immediately before or after a normal message, but is inserted in the middle of a reception interval between normal messages, the messages cannot be properly classified into normal messages and attack messages on the basis of the reception interval, as illustrated in FIG. 31. In other words, when an attack message is inserted in the middle of the reception interval between normal messages, focusing only on the reception interval in the anomalous message sequence may result in a failure to distinguish between the attack message and the normal messages.

Hereinafter, out of Step S2434A and Step S2435A, the detailed processing in Step S2434A, specifically, the process of determining each sensor that is performed when all the messages are successfully classified will be described first.

Figure 32:
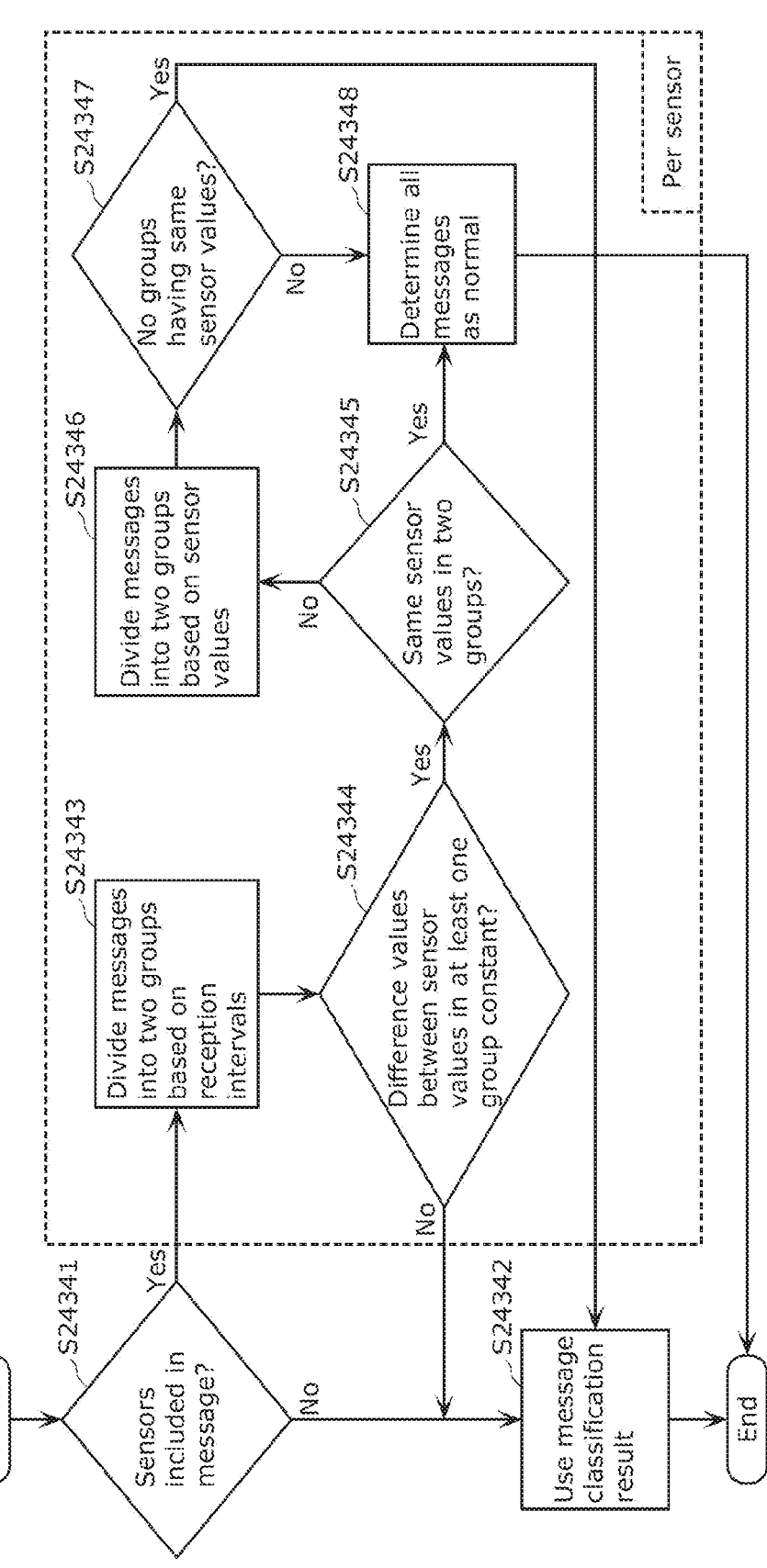
FIG. 32 is a flowchart illustrating one example of the detailed processing in Step S2434A indicated in FIG. 28.
Figure 33A:
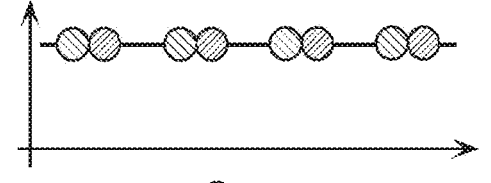
FIG. 33A is a diagram conceptually illustrating one example of the case where the result of Step S24345 indicated in FIG. 32 is Yes.
Figure 33B:
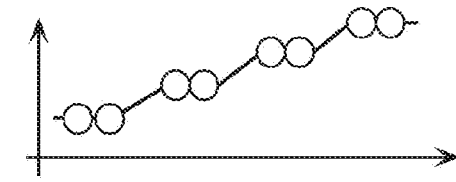
FIG. 33B is a diagram conceptually illustrating one example of the case where the result of Step S24347 indicated in FIG. 32 is Yes.
Figure 33C:
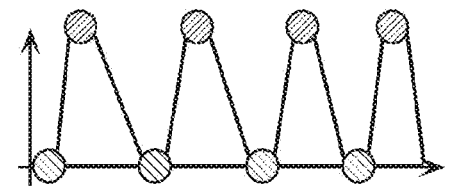
FIG. 33C is a diagram conceptually illustrating one example of the case where the result of Step S24347 indicated in FIG. 32 is No.

FIG. 32 is a flowchart illustrating one example of the detailed processing in Step S2434A indicated in FIG. 28. FIG. 33A is a diagram conceptually illustrating one example of the case where the result of Step S24345 indicated in FIG. 32 is Yes. FIG. 33B is a diagram conceptually illustrating one example of the case where the result of Step S24347 indicated in FIG. 32 is Yes. FIG. 33C is a diagram conceptually illustrating one example of the case where the result of Step S24347 indicated in FIG. 32 is No.

In Step S2434A, first, anomaly detection device 10A determines whether there is information of the plurality of sensors in a message (S24341). More specifically, anomaly detection device 10A determines whether the sensor values obtained from the plurality of sensors are included in each of all the messages included in the predetermined period.

When there is no information of the plurality of sensors in the message in Step S24341 (No in S24341), anomaly detection device 10A uses the result of the classification of all the messages performed in Step S2432A indicated in FIG. 28 (S24342). More specifically, when the sensor values obtained from the plurality of sensors are not included in each of all the messages included in the predetermined period, anomaly detection device 10A outputs, as the result of the detailed processing performed in Step S24342, the result of the classification of all the messages performed in Step S2432A.

On the other hand, when there is information of the plurality of sensors in the message in Step S24341 (Yes in S24341), anomaly detection device 10A performs the processes in Step S24343 to Step S24348 for each sensor. More specifically, when there is information of the plurality of sensors in the message in Step S24341 (Yes in S24341), anomaly detection device 10A performs the process of dividing the messages into two groups on the basis of the reception intervals between the messages (S24343).

Next, using the difference values calculated in Step S2431A indicated in FIG. 28, anomaly detection device 10A determines whether the difference values between the sensor values in at least one of the two groups provided in Step S24343 are constant (S24344).

When the difference values between the sensor values in at least one group are not constant in Step S24344 (No in S24344), anomaly detection device 10A proceeds to Step S24342.

On the other hand, when the difference values between the sensor values in at least one group are constant in Step S24344 (Yes in S24344), anomaly detection device 10A determines whether the sensor values in the two groups are the same values (S24345).

When the sensor values in the two groups are the same value in Step S24345 (Yes in S24345), anomaly detection device 10A proceeds to Step S24348. More specifically, when the sensor values in the two groups are the same value, the sensor values of the attack messages and the normal messages are flat, as illustrated in FIG. 33A, for example, meaning that the attack message and normal message cannot be distinguished from each other. Therefore, anomaly detection device 10A proceeds to Step S24348 and determines that all the messages are normal.

On the other hand, when the sensor values in the two groups are not the same values in Step S24345 (No in S24345), anomaly detection device 10A divides the messages into two groups on the basis of the sensor values using the K-means method or the like as a clustering algorithm (S24346).

Next, anomaly detection device 10A determines whether there are groups having the same sensor values as a result of the process in Step S24346 (S24347).

When there are no groups having the same sensor values in Step S24347 (No in S24347), the processing proceeds to Step S24348. More specifically, when there are no groups having the same sensor group as a result of the process in Step S24346, it is conceivable that copies of normal sensor values are arranged and the normal sensor values (fixed values) fluctuate, as illustrated in FIG. 33B, for example. Therefore, anomaly detection device 10A proceeds to Step S24348 and determines that all the messages are normal.

On the other hand, when there are groups having the same sensor values in Step S24347 (Yes in S24347), the processing proceeds to Step S24342. More specifically, when there are groups having the same sensor values as a result of the process in Step S24346, it is conceivable that there are two groups consisting of a group of normal, constant sensor values and a group of fixed values, as illustrated in FIG. 33C, for example. Therefore, anomaly detection device 10A proceeds to Step S24342 and uses the result of the classification of all the messages performed in Step S2432A.

In this manner, anomaly detection device 10A can determine whether the messages classified in Step S2433A indicated in FIG. 28 are messages provided by an equivalence attack (by an equivalence attack or a shift attack), by clustering the reception intervals and the sensor values and then combining the messages into normal or anomalous groups.

Next, the detailed processing in Step S2435A indicated in FIG. 28, specifically, the process of determining each sensor that is performed when the classification of all the messages is unsuccessful will be described.

Figure 34:
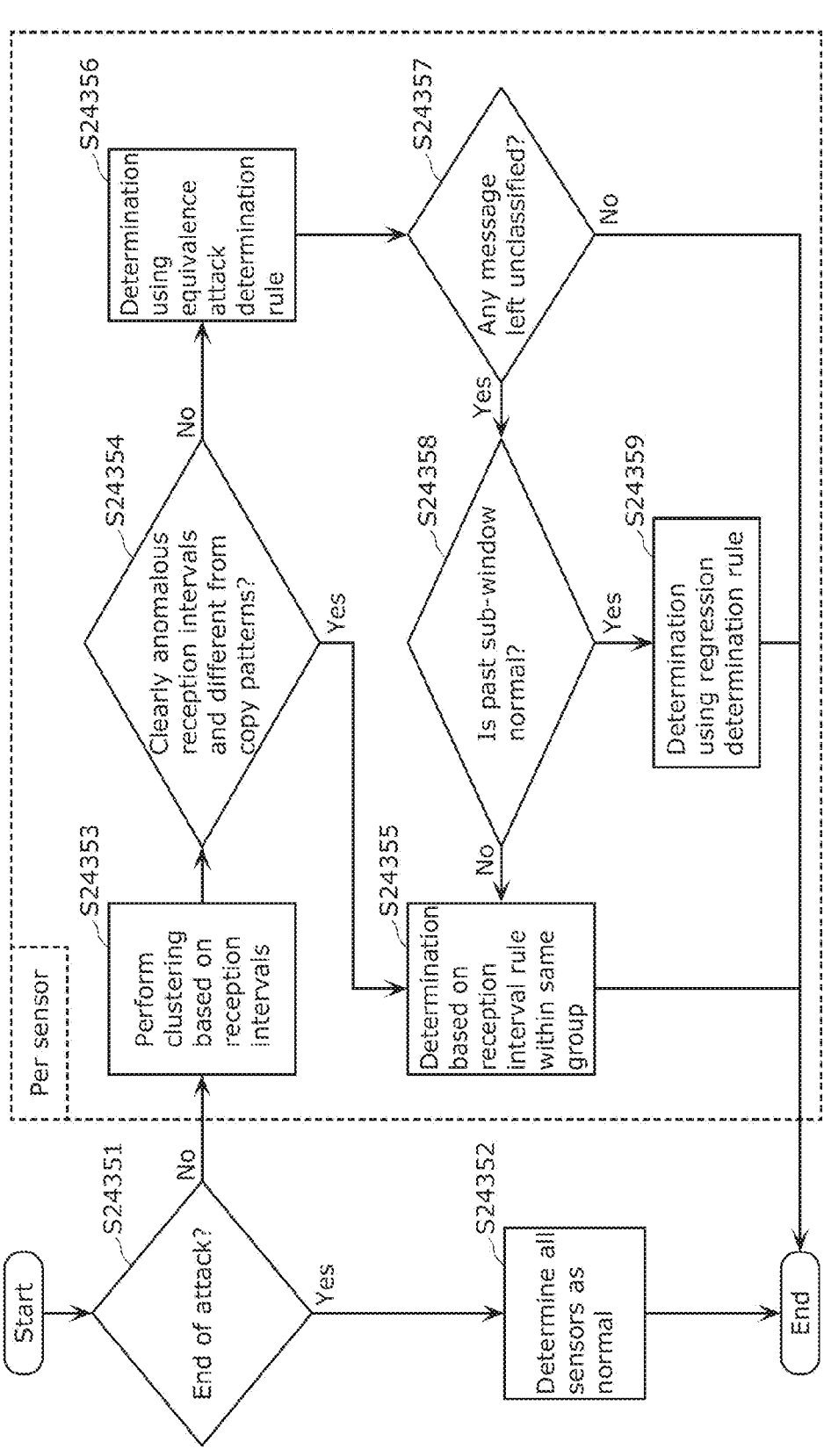
FIG. 34 is a flowchart illustrating one example of the detailed processing in Step S2435A indicated in FIG. 28.
Figure 36C:
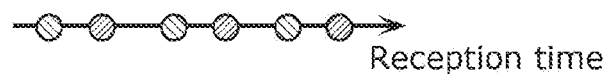
FIG. 36C is a diagram conceptually illustrating one example of the case where the result of Step S24354 indicated in FIG. 34 is Yes.
Figure 36D:
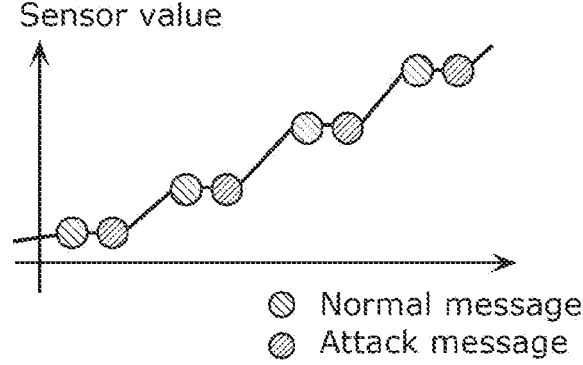
FIG. 36D is a diagram conceptually illustrating one example of the case where the result of Step S24354 indicated in FIG. 34 is Yes.
Figure 36E:
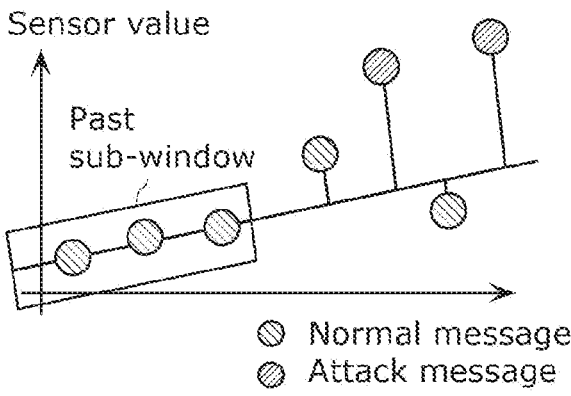
FIG. 36E is a diagram illustrating one example of the result of determination performed in Step S24359 indicated in FIG. 34.

FIG. 34 is a flowchart illustrating one example of the detailed processing in Step S2435A indicated in FIG. 28. FIG. is a diagram illustrating a determination rule used in the detailed processing in Step S2435A indicated in FIG. 28. FIG. 36A is a diagram for conceptually describing whether a message that has failed to be classified is the end of an attack. FIG. 36B is a diagram for conceptually describing a reception interval rule within the same group illustrated in FIG. 35. FIG. 36C and FIG. 36D are diagrams conceptually illustrating one example of the case where the result of Step S24354 indicated in FIG. 34 is Yes. FIG. 36E is a diagram illustrating one example of the result of determination performed in Step S24359 indicated in FIG. 34.

In Step S2435A, first, anomaly detection device 10A determines whether the message is the end of the attack (S24351). More specifically, anomaly detection device 10A determines whether the message that has failed to be classified in Step S2433A is a normal message following an attack message that is the end.

FIG. 36A illustrates, as an example, a message denoted as A that has failed to be classified in the present sub-window in the message sequence and a message denoted as B that is an attack message that is the end in the message sequence. In other words, as illustrated in FIG. 36A, when the message denoted as B is the end of attack messages, the reception interval for only the first message denoted as A in the present sub-window is short, but the reception intervals between the subsequent messages are normal.

When the message is the end of the attack, the above assumption can be made; thus, in the present variation, anomaly detection device 10A checks whether the following three conditions are met, thereby confirming that the message is the end of the attack. Whether to meet the three conditions is whether only the classification of the first message in the present sub-window is unsuccessful, whether the reception intervals between the other messages are normal, and whether an insertion attack has been made in the past sub-window.

When it is confirmed in Step S24351 that the message is the end of the attack (Yes in S24351), anomaly detection device 10A proceeds to Step S24352 and determines that all the sensors are normal (S24352).

On the other hand, when it is confirmed in Step S24351 that the message is not the end of the attack (No in S24351), anomaly detection device 10A performs the processes in Step S24353 to Step S24359 for each sensor. More specifically, when it is confirmed in Step S24351 that the message is not the end of the attack (No in S24351), anomaly detection device 10A performs clustering based on the reception intervals between the messages using the K-means method or the like as a clustering algorithm (S24353).

Next, anomaly detection device 10A determines whether the reception intervals between the plurality of messages included in the group generated by the clustering are clearly anomalous and the plurality of messages are not copy patterns (equivalence) (S24354).

When the reception intervals between the messages are clearly anomalous and the messages are not copy patterns (equivalence) in Step S24354 (Yes in S24354), a determination is made on the basis of the reception interval rule within the same group (S24355).

The case where the reception intervals between the messages are clearly anomalous corresponds to the case where clear classification of the messages into normal and attack groups based on the reception intervals between the messages is possible because there is a disturbance in the reception intervals between the attack messages and the normal messages, for example.

Furthermore, the reception interval rule within the same group stipulates in advance that the same determination result is given to the messages with the same reception interval. More specifically, the reception interval rule within the same group stipulates in advance, for example, the rule indicated in the top stage of FIG. 35.

The reception interval rule within the same group that is indicated in FIG. 35 stipulates that when messages are classified into the normal group, the reception interval between the messages is to be determined as being normal, and when messages are classified into the attack group, the reception interval between the messages is to be determined as being anomalous (under attack). This is because the messages with the same reception intervals are classified into the same group, as illustrated in FIG. 36B, for example. More specifically, when messages are included in frame A, for example, the messages are classified into the normal group and thus, the reception interval between the messages can be determined as being normal. Similarly, when messages are included in frame B, for example, the messages are classified into the attack group and thus, the reception interval between the messages can be determined as being anomalous, meaning that the messages can be determined as attack messages.

On the other hand, when the reception intervals between the messages are not clearly anomalous or the messages are copy patterns (equivalence) in Step S24354 (No in S24354), the processing proceeds to Step S24356 and a determination is made using an equivalence attack determination rule (S24356).

The case where the reception intervals between the messages are not anomalous corresponds to the case where an attack message is inserted in the middle of the cycle of the normal message and the reception intervals between the attack and normal messages are substantially equal, as illustrated in FIG. 36C, for example. Furthermore, the case where the reception intervals between the messages are not anomalous also corresponds to the case where an attack message is inserted midway through a window. The case where the messages are copy patterns (equivalence) corresponds to the case where an attack message having the same sensor value as the sensor value of the normal message (a normal value) is inserted, as illustrated in FIG. 36D, for example.

Furthermore, the equivalence attack determination rule stipulates in advance, for example, the rule indicated in the middle stage of FIG. 35. Specifically, the equivalence attack determination rule indicated in FIG. 35 stipulates that the difference value between each sensor value and the sensor value of the immediately preceding message is calculated, the messages are combined into groups accordingly, the group in which the difference value continues to be 0 is to be determined as being normal, and the group in which the difference value continues to be not 0 is to be determined as being anomalous.

Next, anomaly detection device 10A determines whether there is any message left unclassified (S24357).

When there is no message left unclassified in Step S24357 (No in S24357), anomaly detection device 10A ends the processing because all the messages have been successfully classified.

On the other hand, when there is a message left unclassified in Step S24357 (Yes in S24357), it is determined whether the past sub-window is normal (S24358). Anomaly detection device 10A can determine whether the past sub-window is normal by determining whether all the sensor values of the plurality of messages included in the past sub-window are normal.

When the past sub-window is not normal in Step S24358 (No in S24358), the processing proceeds to Step S24355.

On the other hand, when the past sub-window is normal in Step S24358 (Yes in S24358), anomaly detection device 10A makes a determination using a regression determination rule (S24359).

The regression determination rule stipulates in advance, for example, the rule indicated in the bottom stage of FIG. 35.

The regression determination rule indicated in FIG. 35 stipulates that when there is a small regression error, the message is to be determined as being normal, and when there is a large regression error, the message is to be determined as being anomalous because the sensor value of the normal message changes continuously. When the past sub-window enclosed by a frame is normal as illustrated in FIG. 36E, for example, it is expected that there is a normal message range where the sensor value changes continuously in the same trend in the present sub-window following the last normal message in the past sub-window. Therefore, the regression line of the past sub-window enclosed by the frame is calculated, and the difference between the regression line and the sensor value indicated by a message in the present sub-window is calculated. Thus, when the regression error between the regression line and the sensor value indicated by a message in the present sub-window is small, the message can be determined as being normal, and when the regression error between the regression line and the sensor value indicated by a message in the present sub-window is large, the message can be determined as being anomalous (under attack).

In this manner, anomaly detection device 10A can classify messages that have failed to be classified on the basis of the reception interval in Step S2433A indicated in FIG. 28, further make a determination for each sensor, and thus determine whether the messages that have failed to be classified on the basis of the reception interval are normal or anomalous.

[Possibility of Other Embodiments]

The above embodiments describe the anomaly detection method and the anomaly detection device according to the present disclosure, but subjects, devices, etc., to which the processes are applied are not particularly limited. The processing may be performed by a processor and the like embedded in a specific, locally installed device. The processing may be performed by a cloud server or the like installed in a location different from the location of the local device.

Note that the present disclosure is not limited to the above-described embodiments. For example, other embodiments that can be realized by arbitrarily combining structural elements described in the present specification or by removing some structural elements may be embodiments of the present disclosure. Furthermore, variations obtainable through various changes to the above-described embodiments that can be conceived by a person having ordinary skill in the art without departing from the essence of the present disclosure, that is, the meaning of the recitations in the claims are included in the present disclosure.

Furthermore, the present disclosure includes the following cases.

(1) The above-described device is specifically a computer system configured from a microprocessor, a read only memory (ROM), a random access memory (RAM), a hard disk unit, a display unit, a keyboard, and a mouse, for example. A computer program is stored in the RAM or the hard disk unit. Each device achieves its function as a result of the microprocessor operating according to the computer program. Here, the computer program is configured of a combination of command codes indicating instructions to the computer in order to achieve a predetermined function.

(2) Some or all of the structural elements included in the above-described device may be configured from a single system Large Scale Integration (LSI). A system LSI is a super-multifunction LSI manufactured with a plurality of components integrated on a single chip, and is specifically a computer system configured of a microprocessor, ROM, and RAM, for example. A computer program is stored in the RAM. The system LSI achieves its function as a result of the microprocessor operating according to the computer program.

(3) Some or all of the structural elements included in the above-described device may each be configured from an IC card that is detachably attached to each device or a stand-alone module. The IC card or the module is a computer system made up of a microprocessor, ROM, RAM, and so on. The IC card or the module may include the aforementioned super multifunctional LSI. The IC card and the module achieve their functions as a result of the microprocessor operating according to the computer program. The IC card and the module may be tamperproof.

(4) Moreover, the present disclosure may be the method described above. Furthermore, the present disclosure may be a computer program for implementing these methods using a computer or may be a digital signal of the computer program.

(5) Moreover, the present disclosure may be the aforementioned computer program or digital signal recorded on recording media readable by a computer, such as a flexible disk, a hard disk, a compact disc read-only memory (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be the digital signal recorded on these recoding media.

Furthermore, the present disclosure may be the aforementioned computer program or digital signal transmitted via a telecommunication line, a wireless or wired communication line, a network represented by the Internet, data broadcasting, or the like.

Furthermore, the present disclosure may be a computer system including a microprocessor and a memory. The memory may have the computer program stored therein, and the microprocessor may operate according to the computer program.

Moreover, by transferring the recording medium having the aforementioned program or digital signal recorded thereon or by transferring the aforementioned program or digital signal via the aforementioned network or the like, the present disclosure may be implemented by a different independent computer system.

INDUSTRIAL APPLICABILITY

The present disclosure can be used for an anomaly detection method, an anomaly detection device, and a recording medium by which an anomaly in messages transmitted in an in-vehicle network is detected; in particular, the present disclosure can be used for an anomaly detection method, an anomaly detection device, and a recording medium that are installed on a vehicle together with an in-vehicle network and by which an anomaly in messages transmitted in the in-vehicle network is detected.

The invention claimed is:

1. An anomaly detection method for detecting an anomaly in a network inside a vehicle, the network being included in an in-vehicle network system including a plurality of electronic control units that transmit and receive messages via the network, the anomaly detection method comprising:
obtaining, from a message sequence received from the network, a plurality of messages included in a sliding window that is divided into past, present, and future period sub-windows;
generating, from the obtained plurality of messages, image data of a reception interval between the plurality of messages or image data of a transition of a sensor value of the plurality of messages;
generating, by processing the generated image data through a plurality of convolutional layers and a plurality of pooling layers of a trained convolutional neural network (CNN), an output representing a feature of the generated image data;
classifying the generated image data using a trained bidirectional long-short term memory (BLSTM) based on the generated output according to whether an attack message has been inserted in the plurality of messages included in the sliding window; and
when the attack message has been inserted in the plurality of messages included in the sliding window, outputting a detection result indicating that an insertion attack has been made in the plurality of messages included in the sliding window,
wherein the output representing the feature of the generated image data is a feature vector, and the trained BLSTM classifies a time series of feature vectors corresponding to a plurality of sliding windows to determine whether the attack message has been inserted into the plurality of messages in the sliding window.

2. The anomaly detection method according to claim 1, further comprising:
obtaining the plurality of messages, by dividing, using the a sliding window, the message sequence received from the network; and
generating, from the obtained plurality of messages, the image data representing the reception interval between the plurality of messages or an image representing the transition of the sensor value of the plurality of messages, to generate the image data of the reception interval between the plurality of messages or the image data of the transition of the sensor value of the plurality of messages.

3. The anomaly detection method according to claim 1, further comprising:
determining, when the attack message has been inserted into the plurality of messages in the sliding window, from the sensor value included in each of the plurality of messages, whether the message is the attack message, based on a predetermined rule, the plurality of messages being included in the message sequence.

4. The anomaly detection method according to claim 1, further comprising, when the attack message has been inserted into the plurality of messages in the sliding window:
calculating difference values between sensor values of all combinations of two messages that are sequential in reception time among the plurality of messages included in the message sequence in the sliding window;
combining the plurality of messages into groups according to the calculated difference values;

determining whether all of the difference values included in each of the groups are zero;

outputting, when not all of the difference values are zero, a detection result indicating that the insertion attack has been made in the plurality of messages in the sliding window, the insertion attack being the insertion of the attack message; and outputting, when all of the difference values are zero, the detection result indicating that in the plurality of messages in the sliding window, a message in a group where the difference values are zero is not the attack message.

5. The anomaly detection method according to claim 1, further comprising, when the attack message has been inserted in the plurality of messages in the sliding window:

detecting, from the plurality of messages included in the message sequence in the sliding window-predetermined period, using another trained CNN different from the trained CNN, a message that is the attack message among the plurality of messages and a sensor that has been attacked.

6. The anomaly detection method according to claim 1, further comprising, when the attack message has been inserted in the plurality of messages in the sliding window:

detecting, from each of the plurality of messages included in the message sequence in the sliding window, using the trained BLSTM, whether the message is the attack message.

7. The anomaly detection method according to claim 1, further comprising, when the attack message has been inserted in the plurality of messages in the sliding window:

obtaining a determination result obtained by determining, from the sensor value included in each of the plurality of messages, whether the message is the attack message, based on a predetermined rule, the plurality of messages being included in the message sequence in the sliding window;

obtaining a first detection result indicating a result of detecting, from the plurality of messages included in the message sequence in the sliding window, using another trained CNN different from the trained CNN, a message that is the attack message among the plurality of messages and a sensor that has been attacked;

obtaining a second detection result indicating a result of detecting, from each of the plurality of messages included in the message sequence in the sliding window, using the trained BLSTM, whether the message is the attack message; and performing an ensemble process on the obtained determination result, the obtained first detection result, and the obtained second detection result, and outputting a result of the ensemble process, wherein in the ensemble process, (i) the determination result, the first detection result, or the second detection result is selected, or (ii) the obtained determination result, the obtained first detection result, and the obtained second detection result are integrated by calculation of a weighted average of the obtained determination result, the obtained first detection result, and the obtained second detection result.

8. An anomaly detection device for detecting an anomaly in a network inside a vehicle, the network being included in an in-vehicle network system including a plurality of electronic control units that transmit and receive messages via the network, the anomaly detection device comprising:

a processor; and a memory, wherein the processor is configured to obtain, from a message sequence received from the network, a plurality of messages included in a sliding window that is divided into past, present, and future period sub-windows;

generate, from the obtained plurality of messages, image data of a reception interval between the plurality of messages or image data of a transition of a sensor value of the plurality of messages;

generate, by processing the generated image data through a plurality of convolutional layers and a plurality of pooling layers of a trained convolutional neural network (CNN), an output representing a feature of the generated image data;

classify the generated image data using a trained bidirectional long-short term memory (BLSTM) based on the generated output according to whether an attack message has been inserted in the plurality of messages included in the sliding window; and output, when the attack message has been inserted in the plurality of messages included in the sliding window a detection result indicating that an insertion attack has been made in the plurality of messages included in the sliding window, the insertion attack being an insertion of the attack message, wherein the output representing the feature of the generated image data is a feature vector, and the trained BLSTM classifies a time series of feature vectors corresponding to a plurality of sliding windows to determine whether the attack message has been inserted into the plurality of messages in the sliding window.

9. A non-transitory computer-readable recording medium having recorded thereon a program for causing a computer to execute an anomaly detection method for detecting an anomaly in a network inside a vehicle, the network being included in an in-vehicle network system including a plurality of electronic control units that transmit and receive messages via the network, the program causing the computer to execute the operations of:

obtaining, from a message sequence received from the network, a plurality of messages included in a sliding window that is divided into past, present, and future period sub-windows;

generating, from the obtained plurality of messages, image data of a reception interval between the plurality of messages or image data of a transition of a sensor value of the plurality of messages;

generating, by processing the generated image data through a plurality of convolutional layers and a plurality of pooling layers of a trained convolutional neural network (CNN), an output representing a feature of the generated image data;

classifying the generated image data using a trained bidirectional long-short term memory (BLSTM) based on the generated output according to whether an attack message has been inserted in the plurality of messages included in the sliding window; and outputting, when the attack message has been inserted in the plurality of messages included in the sliding window, a detection result indicating that an insertion attack has been made in the plurality of messages included in the sliding window, the insertion attack being an insertion of the attack message, wherein the output representing the feature of the generated image data is a feature vector, and the trained BLSTM classifies a time series of feature vectors corresponding to a plurality of sliding windows to determine whether the attack message has been inserted into the plurality of messages in the sliding window.

10. The anomaly detection method according to claim 1, further comprising:

generating past, present, and future period sub-windows of the message sequence received by the network inside the vehicle; and using the sub-windows to divide the message sequence to obtain a plurality of messages in a selected sub-window and to generate the image data of the reception interval between the plurality of messages included in the selected sub-window in a predetermined period from the message sequence received from the network or from the image data of the transition of the sensor value of the plurality of messages.

11. The anomaly detection method according to claim 10, further comprising determining a size of each of the sub-windows generated by the sliding window.

12. The anomaly detection method according to claim 11, further comprising:

using the sliding window to generate the past, present, and future period sub-windows of the message sequence received by the network inside the vehicle, wherein the past sub-window is larger than the present and future sub-windows.

13. The anomaly detection method according to claim 12, wherein the present and future sub-windows have the same duration.

14. The anomaly detection method according to claim 13, wherein the size of the past sub-window is set to 200 ms, the size of the present sub-window is set to 100 ms, and the size of the future sub-window is set to 100 ms.

15. The anomaly detection method according to claim 1, further comprising:

determining whether each message in the message sequence in a selected sub-window is normal or anomalous in response to the classifying operation determining that an attack message has been inserted into a plurality of messages in the selected sub-window of the past, present and future period sub-windows; and outputting a determination result of receipt of an anomalous message when a message is determined to be anomalous.

* * * * *